United States Patent
Hanson et al.

(10) Patent No.: US 7,685,512 B2
(45) Date of Patent: Mar. 23, 2010

(54) REPRESENTING LOGICAL MODEL EXTENSIONS AND WIRE FORMAT SPECIFIC RENDERING OPTIONS IN XML MESSAGING SCHEMAS

(75) Inventors: Stephen Michael Hanson, Romsey (GB); Geoffrey Raymond Judd, Basingstoke (GB); Suman Kumar Kalia, Maple (CA); Evangelos Mamas, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 1699 days.

(21) Appl. No.: 10/857,296

(22) Filed: May 28, 2004

(65) Prior Publication Data

US 2005/0268223 A1 Dec. 1, 2005

(51) Int. Cl.
*G06F 17/00* (2006.01)
(52) U.S. Cl. ................................ 715/234; 715/237
(58) Field of Classification Search ............... 715/200, 715/234–238, 249–250; 714/38; 709/206–207, 709/227–229
See application file for complete search history.

(56) References Cited

U.S. PATENT DOCUMENTS

| | | | |
|---|---|---|---|
| 5,970,490 A | 10/1999 | Morgenstern | |
| 6,199,195 B1 | 3/2001 | Goodwin et al. | |
| 7,559,052 B2* | 7/2009 | Kalia et al. | 717/121 |
| 2002/0059566 A1 | 5/2002 | Delacambre et al. | |
| 2002/0120704 A1 | 8/2002 | Karp et al. | 709/207 |
| 2003/0065726 A1 | 4/2003 | Wells et al. | 709/206 |
| 2003/0069975 A1 | 4/2003 | Abjanic et al. | 709/227 |
| 2003/0182624 A1 | 9/2003 | Large | |
| 2003/0204481 A1* | 10/2003 | Lau | 707/1 |
| 2004/0103071 A1* | 5/2004 | Kalia et al. | 706/26 |
| 2005/0060317 A1* | 3/2005 | Lott et al. | 707/10 |
| 2005/0091249 A1* | 4/2005 | Hanson et al. | 707/101 |
| 2005/0091589 A1* | 4/2005 | Ramarao | 715/522 |
| 2006/0150026 A1* | 7/2006 | Kolawa et al. | 714/38 |

OTHER PUBLICATIONS

Binstock et al, 'The XML Schema Complete reference', Addison-Wesley professional, Sep. 26, 2002, sect. 25.3.*
Do, H. et al. "COMA-A System For Flexible Combination of Schema Matching Approaches", Inspect: (AN-7664153) pp. 610-621, 2002.
Aizenbud-Reshef, N. "Coverage Analysis for Message Flows", Inspect: (AN-7169479) pp. 276-286, 2001.

(Continued)

*Primary Examiner*—Cesar B Paula
(74) *Attorney, Agent, or Firm*—Joseph E. Bracken; Law Office of Jim Boice

(57) ABSTRACT

A computer readable medium, method, and device for generating eXtensible Markup Language (XML) schema fragments for use in validating an XML message in a particular wire format is disclosed. The method uses as its input a custom XML schema based message model containing logical model extensions or wire format specific rendering options. The output of the method is an XML schema that includes XML schema fragments. The output schema complies with an accepted XML schema standard recognized by a standard schema validator. At run time, the output XML schema, along with the standard schema validator, may be used at a node which does not understand the custom message model to validate incoming XML messages. Depending upon the manner of generating of the XML schema fragments, the resultant validation may be strict or lax.

91 Claims, 29 Drawing Sheets

OTHER PUBLICATIONS

Ibbotson, J. et al. "Representing a Message Broker Dataflow Architecture".IBM Research Disclosure/TDB, vol. 41, No. 416142, Dec. 1998.

Rahm, E. et al. "A Survey of Approaches to Automatic Schema Matching", The VLDB Journal pp. 334-350, 2001.

Klarlund, N. "DSD: A Schema Language for XML", ACM 1-58113-2620X, pp. 101-111, 2000.

Strobel. M. "Communication Design for Electronic Negotiations on the Basis of XML Schema" ACM 1-58113-348-0, pp. 9-20, 2001.

N. Routledge, L. Bird, A. Goodchild, "UML and XML Schema", Australian Computer Society, Inc., Thirteenth Australasian Database Conference, Melbourne, Australia, Jan. 2002, pp. 1-10.

"Web Service Desciption Language (WSDL) 1.1", W3C Note, Mar. 15, 2001, http://www.w3.org/tr/wsdl#_messages (Retrieved Mar. 2, 2009).

"Simple Object Access Protocol (SOAP) 1.1", M3C Note, May 8, 2000, http://www.w3.org/tr/2000/note-soap-20000508/#_TOC478383512 (Retrieved Mar. 2, 2009).

\* cited by examiner

```
1   <?xml version="1.0" encoding="UTF-8"?>
2   <schema targetNamespace="http://www.ibm.com/employee"
3       xmlns="http://www.w3.org/2001/XMLSchema"
4       xmlns:addr="http://www.ibm.com/address"
5       xmlns:emp="http://www.ibm.com/employee">
6       <include schemaLocation="ContactInfo.mxsd"/>
7       <import namespace="http://www.ibm.com/address"
8       schemaLocation="../address/address.mxsd"/>
9       <complexType name="EmployeeInfo">
10          <sequence>
11              <element name="employeeType">
12                  <annotation>
13                      <appinfo source="WMQI_APPINFO">
14                          <xmlInclRep messageSetDefaultRep="XML1"
15  render="XMLAttribute"/>
16                      </appinfo>
17                  </annotation>
18                  <simpleType>
19                      <restriction base="short">
20                          <minInclusive value="0"/>
21                          <maxInclusive value="9"/>
22                      </restriction>
23                  </simpleType>
24              </element>
25          <element name="name">
26              <complexType>
27                  <sequence>
28                      <element name="firstname" type="string">
29                          <annotation>
30                              <appinfo source="WMQI_APPINFO">
31                                  <xmlInclRep
32  messageSetDefaultRep="XML1"
33  render="XMLElementAttrVal"
```

```
34              valueAttrName="val"
35 valueAttrNameNSURI="http://www.ibm.com/employee"/>
36            </appinfo>
37          </annotation>
38        </element>
39        <element name="middlename" type="string">
40          <annotation>
41            <appinfo source="WMQI_APPINFO">
42              <xmlInclRep
43                messageSetDefaultRep="XML1"
44                render="XMLElementAttrVal"
45                valueAttrName="val"
46 valueAttrNameNSURI="http://www.ibm.com/employee"/>
47            </appinfo>
48          </annotation>
49        </element>
50        <element name="lastname" type="string">
51          <annotation>
52            <appinfo source="WMQI_APPINFO">
53              <xmlInclRep
54                messageSetDefaultRep="XML1"
55                render="XMLElementAttrVal"
56                valueAttrName="val"
57 valueAttrNameNSURI="http://www.ibm.com/employee"/>
58            </appinfo>
59          </annotation>
60        </element>
61      </sequence>
62    </complexType>
63  </element>
64  <element name="address" type="addr:Address">
65    <annotation>
66      <appinfo source="WMQI_APPINFO">
```

FIG. 3C

```
67          <xmlInclRep idAttrName="country"
68                      idAttrNameNSURI="http://www.ibm.com/country"
69                      idAttrValue=""Canada""
70                      messageSetDefaultRep="XML1"
71   render="XMLElementAttrID"/>
72        </appinfo>
73      </annotation>
74    </element>
75    <element name="salary">
76      <simpleType>
77        <restriction base="decimal">
78          <minInclusive value="0"/>
79          <maxInclusive value="999999.99"/>
80        </restriction>
81      </simpleType>
82    </element>
83    <element name="contactInfo" type="emp:ContactInfoType"/>
84    <element name="emergencyContactInfo"
85   type="emp:EmergencyContactInfoType"/>
86      </sequence>
87    </complexType>
88    <element name="empInfo" type="emp:EmployeeInfo">
89      <annotation>
90        <appinfo source="WMQI_APPINFO">
91          <MRMessage
92   messageDefinition="/empInfo/XSDElementDeclaration/"/>
93        </appinfo>
94      </annotation>
95    </element>
96  </schema>
```

```
1  <?xml version="1.0" encoding="UTF-8"?>
2  <schema targetNamespace="http://www.ibm.com/address"
3      xmlns="http://www.w3.org/2001/XMLSchema"
4  xmlns:addr="http://www.ibm.com/address">
5      <complexType name="Address">
6          <sequence>
7              <element name="streetno">
8                  <simpleType>
9                      <restriction base="short">
10                         <minInclusive value="0"/>
11                         <maxInclusive value="999"/>
12                     </restriction>
13                 </simpleType>
14             </element>
15             <element name="streetName">
16                 <simpleType>
17                     <restriction base="string">
18                         <maxLength value="30"/>
19                     </restriction>
20                 </simpleType>
21             </element>
22             <element name="city">
23                 <simpleType>
24                     <restriction base="string">
25                         <maxLength value="20"/>
26                     </restriction>
27                 </simpleType>
28             </element>
29             <element name="zipCode">
30                 <simpleType>
31                     <restriction base="string">
32                         <maxLength value="6"/>
33                     </restriction>
34                 </simpleType>
35             </element>
36         </sequence>
37     </complexType>
38 </schema>
```

FIG. 4

```
1  <?xml version="1.0" encoding="UTF-8"?>
2  <xsd:schema targetNamespace="http://www.ibm.com/employee"
3    xmlns:contactInfo="http://www.ibm.com/employee" xmlns:xsd="http://
4  www.w3.org/2001/XMLSchema">
5    <xsd:element name="resPhoneNo" type="xsd:string"/>
6    <xsd:element name="officePhoneNo" type="xsd:string"/>
7    <xsd:element name="faxNo" type="xsd:string"/>
8    <xsd:element name="cellPhoneNo" type="xsd:string"/>
9    <xsd:complexType name="ContactInfoType">
10     <xsd:annotation>
11       <xsd:appinfo source="WMQI_APPINFO">
12         <MRComplexType composition="unorderedSet" content="closed"/>
13       </xsd:appinfo>
14     </xsd:annotation>
15     <xsd:sequence>
16       <xsd:element ref="contactInfo:resPhoneNo"/>
17       <xsd:element ref="contactInfo:officePhoneNo"/>
18       <xsd:element ref="contactInfo:faxNo"/>
19       <xsd:element ref="contactInfo:cellPhoneNo"/>
20     </xsd:sequence>
21   </xsd:complexType>
22   <xsd:complexType name="EmergencyContactInfoType">
23     <xsd:group ref="contactInfo:EmergencyContactInfoGroup"/>
24   </xsd:complexType>
25   <xsd:group name="EmergencyContactInfoGroup">
26     <xsd:annotation>
27       <xsd:appinfo source="WMQI_APPINFO">
28         <MRGlobalGroup content="openDefined"/>
29       </xsd:appinfo>
30     </xsd:annotation>
31     <xsd:sequence>
```

FIG. 5A

```
32      <xsd:element name="personName" type="xsd:string">
33        <xsd:annotation>
34          <xsd:appinfo source="WMQI APPINFO">
35            <xmlInclRep messageSetDefaultRep="XML1"
   xmlName="emergencyContactPersonName"/>
36          </xsd:appinfo>
37        </xsd:annotation>
38      </xsd:element>
39      <xsd:element name="personPhoneNo" type="xsd:string">
40        <xsd:annotation>
41          <xsd:appinfo source="WMQI APPINFO">
42            <xmlInclRep messageSetDefaultRep="XML1"
43              render="XMLAttribute" xmlName="emergencyPhoneNo"/>
44          </xsd:appinfo>
45        </xsd:annotation>
46      </xsd:element>
47      <xsd:element ref="contactInfo:cellPhoneNo">
48        <xsd:annotation>
49          <xsd:appinfo source="WMQI APPINFO">
50            <xmlInclRep messageSetDefaultRep="XML1"
51              xmlName="emergencyCellPhone"/>
52          </xsd:appinfo>
53        </xsd:annotation>
54      </xsd:element>
55    </xsd:sequence>
56  </xsd:group>
57 </xsd:schema>
```

FIG. 5B

```
 1  <?xml version="1.0" encoding="UTF-8"?>
 2  <emp:empInfo xmlns:addr="http://www.ibm.com/address"
 3               xmlns:emp="http://www.ibm.com/employee"
 4               xmlns:xsi="http://www.w3.org/2001/XMLSchema-instance"
 5               xsi:schemaLocation="http://www.ibm.com/employee employee.xsd
 6                                   http://www.ibm.com/address
 7   ../address/address.xsd ">
 8   <employeeType>0</employeeType>
 9   <name>
10     <firstname>Joe</firstname>
11     <middlename>L</middlename>
12     <lastname>Pearson</lastname>
13   </name>
14   <address>
15     <streetno>100</streetno>
16     <streetName>Main Street</streetName>
17     <city>Markham</city>
18     <zipCode>M3C1H7</zipCode>
19   </address>
20   <salary>450000.0</salary>
21   <contactInfo>
22     <emp:resPhoneNo>416-444-4444</emp:resPhoneNo>
23     <emp:officePhoneNo>905-967-9999</emp:officePhoneNo>
24     <emp:faxNo>416-444-4445</emp:faxNo>
25     <emp:cellPhoneNo>647-286-3333</emp:cellPhoneNo>
26   </contactInfo>
27   <emergencyContactInfo>
28     <personName>Mark L Pearson</personName>
29     <personPhoneNo>905-868-8888</personPhoneNo>
30     <emp:cellPhoneNo>905-877-8989</emp:cellPhoneNo>
31   </emergencyContactInfo>
32  </emp:empInfo>
```

FIG. 6

```
1  <?xml version="1.0" encoding="UTF-8"?>
2  <emp:empInfo employeeType="0" xmlns:addr="http://www.ibm.com/address"
3       xmlns:emp="http://www.ibm.com/employee"
4       xmlns:schGen1="http://www.ibm.com/country"
5       xmlns:xsi="http://www.w3.org/2001/XMLSchema-instance"
6       xsi:schemaLocation="http://www.ibm.com/employee employee.xsd
7                           http://www.ibm.com/address ../address/address.xsd
8                           http://www.ibm.com/country
9  ../country/XMLlauxGenFile_extension.xsd ">
10     <name>
11         <firstname val="Joe"/>
12         <middlename val="L"/>
13         <lastname val="Pearson"/>
14     </name>
15     <address schGen1:country="Canada">
16         <streetno>100</streetno>
17         <streetName>Main Street</streetName>
18         <city>Markham</city>
19         <zipCode>M3C1H7</zipCode>
20     </address>
21     <salary>450000.0</salary>
22     <contactInfo>
23         <emp:resPhoneNo>416-444-4444</emp:resPhoneNo>
24         <emp:officePhoneNo>905-967-9999</emp:officePhoneNo>
25         <emp:faxNo>416-444-4445</emp:faxNo>
26         <emp:cellPhoneNo>647-286-3333</emp:cellPhoneNo>
27     </contactInfo>
28     <emergencyContactInfo emergencyPhoneNo="905-868-8888">
29         <emergencyContactPersonName>Mark L Pearson</emergencyContactPersonName>
30         <emergencyCellPhone>905-877-8989</emergencyCellPhone>
31     </emergencyContactInfo>
32  </emp:empInfo>
```

FIG. 7

```
1   <?xml version="1.0" encoding="UTF-8"?>
2   <schema targetNamespace="http://www.ibm.com/employee"
3       xmlns="http://www.w3.org/2001/XMLSchema"
4       xmlns:Q1="http://www.ibm.com/country"
5       xmlns:addr="http://www.ibm.com/address"
6       xmlns:emp="http://www.ibm.com/employee"
7   xmlns:schGen1="http://www.ibm.com/country">
8       <include schemaLocation="ContactInfo.xsd"/>
9       <import namespace="http://www.ibm.com/address"
10      schemaLocation="../address/address.xsd"/>
11      <import namespace="http://www.ibm.com/country"
12      schemaLocation="../country/XMLlauxGenFile_extension.xsd"/>
13      <complexType name="EmployeeInfo">
14          <sequence>
15              <element name="name">
16                  <complexType>
17                      <sequence>
18                          <element name="firstname">
19                              <complexType>
20                                  <simpleContent>
21                                      <extension base="string">
22                                          <attribute name="val" type="string"/>
23                                      </extension>
24                                  </simpleContent>
25                              </complexType>
26                          </element>
27                          <element name="middlename">
28                              <complexType>
29                                  <simpleContent>
30                                      <extension base="string">
31                                          <attribute name="val" type="string"/>
32                                      </extension>
33                                  </simpleContent>
```

FIG. 9A

```
34      </complexType>
35    </element>
36    <element name="lastname">
37      <complexType>
38        <simpleContent>
39          <extension base="string">
40            <attribute name="val" type="string"/>
41          </extension>
42        </simpleContent>
43      </complexType>
44    </element>
45  </sequence>
46  </complexType>
47  </element>
48  <element name="address">
49    <complexType>
50      <complexContent>
51        <extension base="addr:Address">
52          <attribute ref="Q1:country"/>
53        </extension>
54      </complexContent>
55    </complexType>
56  </element>
57  <element name="salary">
58    <simpleType>
59      <restriction base="decimal">
60        <minInclusive value="0"/>
61        <maxInclusive value="999999.99"/>
62      </restriction>
63    </simpleType>
64  </element>
65  <element name="contactInfo" type="emp:ContactInfoType"/>
66  <element name="emergencyContactInfo"
```

FIG. 9B

```
67       type="emp:EmergencyContactInfoType"/>
68         </sequence>
69         <attribute name="employeeType">
70           <simpleType>
71             <restriction base="short">
72               <minInclusive value="0"/>
73               <maxInclusive value="9"/>
74             </restriction>
75           </simpleType>
76         </attribute>
77       </complexType>
78       <element name="empInfo" type="emp:EmployeeInfo"/>
79     </schema>
```

FIG. 9C

```
1  <?xml version="1.0" encoding="UTF-8"?>
2  <schema targetNamespace="http://www.ibm.com/address"
3      xmlns="http://www.w3.org/2001/XMLSchema"
4  xmlns:addr="http://www.ibm.com/address">
5      <complexType name="Address">
6          <sequence>
7              <element name="streetno">
8                  <simpleType>
9                      <restriction base="short">
10                         <minInclusive value="0"/>
11                         <maxInclusive value="999"/>
12                     </restriction>
13                 </simpleType>
14             </element>
15             <element name="streetName">
16                 <simpleType>
17                     <restriction base="string">
18                         <maxLength value="30"/>
19                     </restriction>
20                 </simpleType>
21             </element>
22             <element name="city">
23                 <simpleType>
24                     <restriction base="string">
25                         <maxLength value="20"/>
26                     </restriction>
27                 </simpleType>
28             </element>
29             <element name="zipCode">
30                 <simpleType>
31                     <restriction base="string">
32                         <maxLength value="6"/>
33                     </restriction>
34                 </simpleType>
35             </element>
36         </sequence>
37     </complexType>
38 </schema>
```

```
1  <?xml version="1.0" encoding="UTF-8"?>
2  <xsd:schema targetNamespace="http://www.ibm.com/employee"
3       xmlns:contactInfo="http://www.ibm.com/employee"
4       xmlns:xsd="http://www.w3.org/2001/XMLSchema">
5     <xsd:element name="resPhoneNo" type="xsd:string"/>
6     <xsd:element name="officePhoneNo" type="xsd:string"/>
7     <xsd:element name="faxNo" type="xsd:string"/>
8     <xsd:element name="cellPhoneNo" type="xsd:string"/>
9     <xsd:complexType name="ContactInfoType">
10       <xsd:sequence>
11          <xsd:element ref="contactInfo:resPhoneNo"/>
12          <xsd:element ref="contactInfo:officePhoneNo"/>
13          <xsd:element ref="contactInfo:faxNo"/>
14          <xsd:element ref="contactInfo:cellPhoneNo"/>
15       </xsd:sequence>
16    </xsd:complexType>
17    <xsd:complexType name="EmergencyContactInfoType">
18       <xsd:group ref="contactInfo:EmergencyContactInfoGroup"/>
19       <xsd:attribute name="emergencyPhoneNo" type="xsd:string"/>
20    </xsd:complexType>
21    <xsd:group name="EmergencyContactInfoGroup">
22       <xsd:sequence>
23          <xsd:element name="emergencyContactPersonName" type="xsd:string"/>
24          <xsd:element name="emergencyCellPhone" type="xsd:string"/>
25       </xsd:sequence>
26    </xsd:group>
27 </xsd:schema>
```

```
1  <?xml version="1.0" encoding="UTF-8"?>
2  <schema targetNamespace="http://www.ibm.com/country"
3      xmlns="http://www.w3.org/2001/XMLSchema"
4  xmlns:auxGen="http://www.ibm.com/country">
5      <attribute name="country">
6          <simpleType>
7              <restriction base="string"/>
8          </simpleType>
9      </attribute>
10 </schema>
```

FIG. 12

```
1  <element name="xmlNameOfElement">
2      <complexType>
3          <sequence>
4              <any processContents="lax"
5                   minOccurs="0"
6                   maxOccurs="unbounded" />
7          </sequence>
8      </complexType>
9  </element>
```

FIG. 18

```
1  <element name="xmlNameOfElement">
2    <complexType>
3      <sequence>
4        <any processContents="lax"
5             minOccurs="0"
6             maxOccurs="unbounded"
7             namespace="http://www.ns1.com http://www.ns2.com" />
8      </sequence>
9    </complexType>
10 </element>
```

FIG. 19

```
1  <element name="xmlNameOfElement">
2    <complexType>
3      <sequence
4         maxOccurs="unbounded"
5         minOccurs="(minOccurs of original sequence) *
6                    (number of items in original sequence)" >
7        <choice>
8          (original sequence contents)
9        </choice>
10     </sequence>
11   </complexType>
12 </element>
```

```
1  <?xml version="1.0" encoding="UTF-8"?>
2  <xsd:schema targetNamespace="http://www.ibm.com/employee"
3      xmlns:contactInfo="http://www.ibm.com/employee"
4      xmlns:xsd="http://www.w3.org/2001/XMLSchema">
5      <xsd:element name="resPhoneNo" type="xsd:string"/>
6      <xsd:element name="officePhoneNo" type="xsd:string"/>
7      <xsd:element name="faxNo" type="xsd:string"/>
8      <xsd:element name="cellPhoneNo" type="xsd:string"/>
9      <xsd:complexType name="ContactInfoType">
10         <xsd:sequence maxOccurs="unbounded" minOccurs="4">
11             <xsd:choice>
12                 <xsd:element ref="contactInfo:resPhoneNo"/>
13                 <xsd:element ref="contactInfo:officePhoneNo"/>
14                 <xsd:element ref="contactInfo:faxNo"/>
15                 <xsd:element ref="contactInfo:cellPhoneNo"/>
16             </xsd:choice>
17         </xsd:sequence>
18     </xsd:complexType>
19     <xsd:complexType name="EmergencyContactInfoType">
20         <xsd:sequence>
21             <xsd:any maxOccurs="unbounded" minOccurs="0"
22                 namespace="http://www.ibm.com/employee" processContents="lax"/>
23             http://www.ibm.com/address
24         </xsd:sequence>
25         <xsd:attribute name="emergencyPhoneNo" type="xsd:string"/>
26     </xsd:complexType>
27     <xsd:group name="EmergencyContactInfoGroup">
28         <xsd:sequence>
29             <xsd:any maxOccurs="unbounded" minOccurs="0"
30                 namespace="http://www.ibm.com/employee" processContents="lax"/>
31             http://www.ibm.com/address
32         </xsd:sequence>
33     </xsd:group>
34 </xsd:schema>
```

```
1  <?xml version="1.0" encoding="UTF-8"?>
2  <MSGModel:MRMessageSet xmi:version="2.0" xmlns:xmi="http://www.omg.org/XMI"
3  xmlns:MSGModel="MSGModel.xmi" xmi:id="MRMessageSet_1" name="SchemaGen"
4  namespacesEnabled="true" currentMessageSetId="MRMessageSetID_1">
5      <MRMessageSetRep xmi:type="MSGModel:MRXMLMessageSetRep"
6  xmi:id="MRXMLMessageSetRep_1" name="XML1" timeZoneID="0"
7  doctypeSystemID="www.mrmnames.net/JJOPG74002001"
8  doctypePublicID="JJOPG74002001"/>
9      <MRMessageSetID xmi:id="MRMessageSetID_1" repositoryId="-1713164231"
10 messageSetId="1" level="1"/>
11 </MSGModel:MRMessageSet>
```

FIG. 22

REPRESENTING LOGICAL MODEL EXTENSIONS AND WIRE FORMAT SPECIFIC RENDERING OPTIONS IN XML MESSAGING SCHEMAS

COPYRIGHT NOTICE AND PERMISSION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention relates to eXtensible Markup Language (XML) schemas, and more particularly to XML messaging schemas which contain logical model extensions and wire format specific rendering options.

2. Description of the Related Art

In recent years, use of the eXtensible Markup Language has become increasingly prevalent in business. This trend is largely attributable to the flexibility of XML as a mechanism for defining the structure and content of data. XML allows users to define schemas comprising a set of ASCII-based elements and attributes in a structural relationship to define a non-programming language specific data type (i.e. a data type that is defined without use of particular programming language). The elements and attributes defined in an XML schema may then be used as "tags" or labels in one or more XML instance documents (i.e. XML documents conforming to an XML schema and containing actual data) which may instantiate earlier defined data types. When XML instance documents are forwarded to other users or enterprises, the XML schema may be used by the recipient to "understand" the instance document. Sharing of data across divergent operating systems and platforms is thus supported.

The World Wide Web Consortium (W3C) has provided a recommendation for XML schemas, known as "XML Schema 1.0", which has become a de facto standard in the industry. This recommendation (alternatively referred to herein as the "W3C recommendation") is attached hereto as Appendix I. Since its original publication, various errata have been identified in the W3C recommendation. The latter document is attached hereto as Appendix II. Subsequent references to the XML Schema 1.0 recommendation or XML Schema 1.0 standard appearing hereinafter may be understood to incorporate corrections to the errata canvassed in the latter document.

There has also recently been a phenomenal increase in Business-to-Business ("B2B") transactions in which transaction data is encoded in XML.

A problem that has been encountered in respect of B2B transactions is the use by different enterprises of different wire formats for messages. As is known in the art, a wire format describes how data is encoded "on the wire" when it is sent from one system to another. Assuming that a business enterprise has N partners, if each partner employs a different wire format, the enterprise will be required to encode/decode the same logical data into/from N different wire formats. The encoding/decoding problem becomes onerous as the number N of wire formats becomes large.

To address the above problem, message brokers have been developed. As is known in the art, a message broker is an intermediary program which converts messages from the wire format of a sender to the wire format of a receiver. The IBM® WebSphere® Business Integration Message Broker software is one example of a message broker. IBM and WebSphere are registered trademarks of the International Business Machines Corporation.

To support efficient conversion of messages from one wire format to another, some message brokers such as the WebSphere® Business Integration Message Broker utilize a message model having two components: a logical model and a physical model. The logical model, which may be an XML schema for example, describes the logical structure of a set of messages for a particular application, e.g., banking, insurance, or travel, in a platform and programming language neutral manner. The physical model defines the manner in which the messages are represented in alternative wire formats. Such a message model is described in co-pending U.S. patent application Ser. No. 10/703,037, filed Nov. 6, 2003, which is hereby incorporated by reference hereinto.

As indicated in the above referenced application, message models of the type described above can define logical model extensions which are not supported in the standard XML schema 1.0 standard.

One example of a logical model extension is a composition kind attribute which extends the standard composition types of XML schemas (choice, sequence, and all) with the enumeration "unorderedSet". The "unorderedSet" enumeration is similar to "sequence" (which requires all elements of a message to appear in sequence) except that elements within the set may occur in any order.

In another example of a logical model extension, a content kind attribute which comprises three enumerations representing alternative types of constraints of a message's elements that may be applicable to a message received on the wire can be defined, as follows:

1. "closed"—Default enumeration indicating that a message bit stream is to match the definition of the message in the logical model exactly (as implicitly defined in the XML Schema recommendation);
2. "openDefined"—indicates that a message bit stream can contain any elements which have been defined in the current message set; and
3. "open"—the message bit stream can contain any elements, even those that have been defined in different message sets or not defined in any message set. For clarity, the term "message set" is described in co-pending U.S. patent application Ser. No. 10/703,037, incorporated by reference above.

Another benefit of the message model described above is that it can be used to define physical, wire format specific rendering options. For example, the XMLInclusionRep construct can be used to specify the manner in which a logical XML schema element (either a local element or referenced global element) should be rendered when transmitted in a particular wire format (e.g., render element X as an attribute in messages of wire format Y). Using this construct it is possible to specify that the same logical XML schema element should be rendered differently for each of a number of wire formats.

In a network of systems executing the same message broker software, instance documents containing such logical model extensions and/or such wire format specific rendering options can be exchanged and validated without difficulty, since the message models used to create messages are commonly understood. However, in a heterogeneous environment, some business enterprises may not be executing the same message broker software as a partner defining the non-standard constructs. Such business enterprises will be unable to validate messages sent by its partner as the non-standard constructs will not be understood.

What is needed is a solution which addresses at least some of the above noted difficulties.

SUMMARY OF THE INVENTION

A computer readable medium, method, and device for generating eXtensible Markup Language (XML) schema fragments for use in validating an XML message in a particular wire format is disclosed. The method uses as its input a custom XML schema based message model containing logical model extensions or wire format specific rendering options. The output of the method is an XML schema that includes XML schema fragments. The output schema complies with an accepted XML schema standard recognized by a standard schema validator. At run time, the output XML schema, along with the standard schema validator, may be used at a node which does not understand the custom message model to validate incoming XML messages. Depending upon the manner of generating of the XML schema fragments, the resultant validation may be strict or lax.

In accordance with an aspect of the present invention there is provided a computer readable medium for use in validating an XML message in a particular wire format, said computer readable medium containing computer-executable instructions which, when performed by a processor in a computing device, cause the computing device to: from a custom XML schema based message model having at least one wire format specific rendering option associated with an XML entity representing at least a portion of said message, generate an XML schema fragment for use in validating said XML message at a node which lacks said custom XML schema based message model, said XML schema fragment conforming to said particular wire format.

In accordance with another aspect of the present invention there is provided a computer readable medium for use in validating an XML message, said computer readable medium containing computer-executable instructions which, when performed by a processor in a computing device, cause the computing device to: from a custom XML schema based message model having at least one logical model extension, generate an XML schema fragment for use in validating said XML message at a node which lacks said custom XML schema based message model.

In accordance with still another aspect of the present invention there is provided a method for use in validating an XML message in a particular wire format, the method comprising: from a custom XML schema based message model having at least one wire format specific rendering option associated with an XML entity representing at least a portion of said message, generating an XML schema fragment for use in validating said XML message at a node which lacks said custom XML schema based message model, said XML schema fragment conforming to said particular wire format.

In accordance with yet another aspect of the present invention there is provided a method for use in validating an XML message, the method comprising: from a custom XML schema based message model having at least one logical model extension, generating an XML schema fragment for use in validating said XML message at a node which lacks said custom XML schema based message model.

In accordance with still another aspect of the present invention there is provided a computing device for use in validating an XML message in a particular wire format, said computing device comprising a processor and persistent storage memory in communication with said processor storing computer readable instructions for directing said device to: from a custom XML schema based message model having at least one wire format specific rendering option associated with an XML entity representing at least a portion of said message, generate an XML schema fragment for use in validating said XML message at a node which lacks said custom XML schema based message model, said XML schema fragment conforming to said particular wire format.

In accordance with yet another aspect of the present invention there is provided a computing device for use in validating an XML message, said computing device comprising a processor and persistent storage memory in communication with said processor storing computer readable instructions for directing said device to: from a custom XML schema based message model having at least one logical model extension, generate an XML schema fragment for use in validating said XML message at a node which lacks said custom XML schema based message model.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In the figures which illustrate an example embodiment of this invention:

FIGS. 3A, 3B and 3C illustrate a portion of the message model of FIG. 2 in serialized form;

FIG. 4 illustrates another portion of the message model of FIG. 2 in serialized form;

FIGS. 5A and 5B illustrate yet another portion of the message model of FIG. 2 in serialized form;

FIG. 6 illustrates a serialized XML instance document based on the message model of FIG. 2 which represents a message in a default wire format;

FIG. 7 illustrates a serialized XML instance document based on the message model of FIG. 2 which represents the message of FIG. 6 in an alternative wire format;

FIGS. 9A, 9B and 9C illustrate a portion of the generated XML schema of FIG. 8 in serialized form;

FIG. 10 illustrates another portion of the generated XML schema of FIG. 8 in serialized form;

FIG. 11 illustrates yet another portion of the generated XML schema of FIG. 8 in serialized form;

FIG. 12 illustrates still another portion of the generated XML schema of FIG. 8 in serialized form;

FIG. 18 illustrates a pattern for rendering an XML schema fragment according to one logical model extension;

FIG. 19 illustrates a pattern for rendering an XML schema fragment according to another logical model extension;

FIG. 20 illustrates a pattern for rendering an XML schema fragment according to yet another logical model extension;

FIG. 21 illustrates an alternative version of the XML schema portion of FIG. 11 in serialized form rendered using the lax mode; and FIG. 22 illustrates another portion of the message model of FIG. 2 in serialized form.

DESCRIPTION OF THE PREFERRED EMBODIMENT

Figure 1:
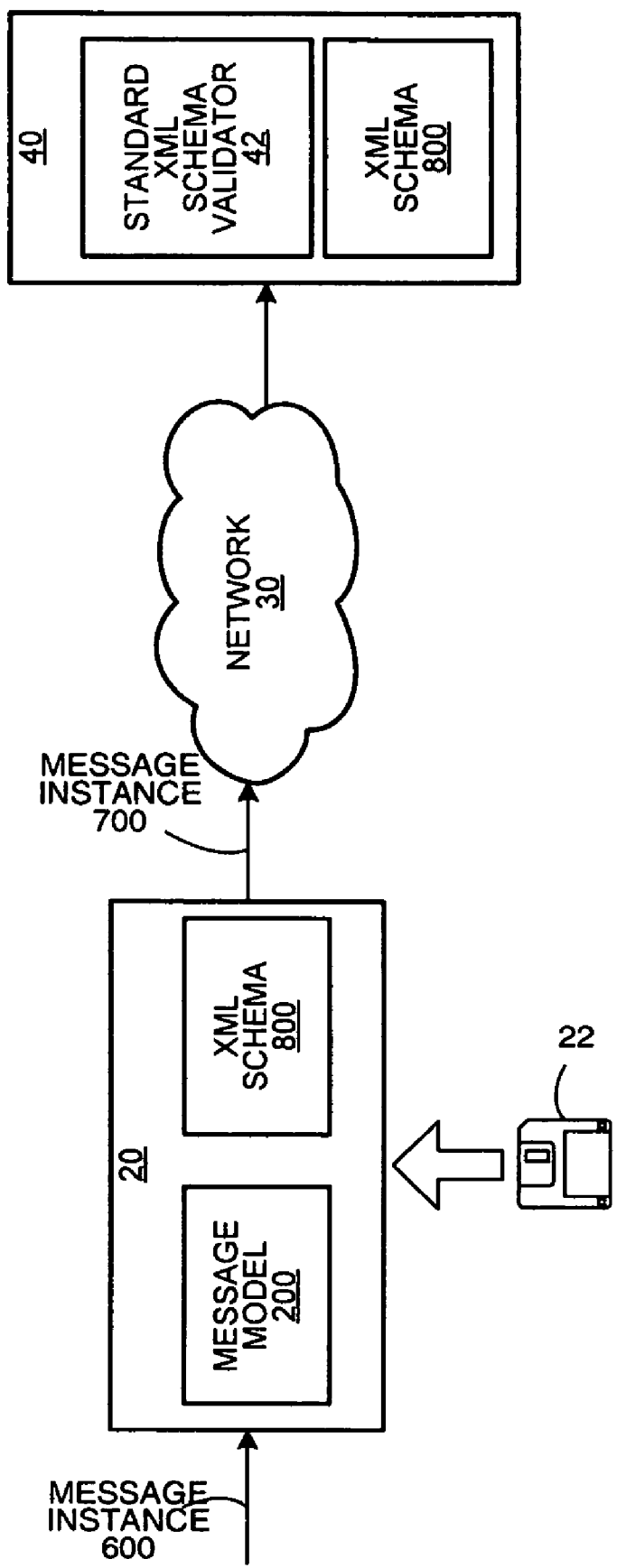
FIG. 1 illustrates a computer server exemplary of an embodiment of the present invention interconnected with another computer server by way of a communications network.

In overview, the present embodiment may be described as a black box with two inputs and one output.

The first input to the black box is a custom, XML schema based message model having two components. The first component is a logical model defining one or more messages. The logical model conforms to an accepted XML standard such as XML schema 1.0. The second component (which may be referred to as the "physical model") consists of two types of message model "customizations" which do not conform to the accepted XML standard. The first type of customization is referred to as a logical model extension. A logical model extension extends the accepted XML standard to permit new ways of logically describing messages that are not possible using only the accepted XML standard. The second type of customization is referred to as a wire format specific rendering option. A wire format specific rendering option is a directive which specifies that a logically-defined message (or message component, such as a field within a message) should be formatted in a particular way when it is rendered (i.e. instantiated for transmission) in a specific wire format. A single logically-defined message may have multiple wire format specific rendering options, each stipulating a different way of formatting the same information for a different wire format.

The second input to the black box is a request to generate an XML schema for a particular wire format in either a strict mode or a lax mode.

The output of the black box is an XML schema which incorporates not only the logical message definitions of the first message model component but also relevant "customizations" from the second message model component, yet conforms to the accepted XML schema standard. Relevant customizations include all logical model extensions from the physical model and any rendering options from the physical model that are specific to the requested wire format. The resultant XML schema is wire format specific. Because the generated XML schema conforms to the accepted XML schema standard, it may be used by a standard schema validator to validate messages of the requested wire format. As a result, when a node (e.g. computer server) which understands the custom XML schema based message model uses the black box method to generate a wire format specific XML schema, and then the generated XML schema is communicated in some fashion, before run time, to another node which does not understand the custom message model, the latter node can use the XML schema at run time with a standard schema validator to validate incoming XML messages of the requested wire format despite its lack of understanding of the custom message model.

The output XML schema may look different depending upon its original content and whether strict mode or lax mode has been elected. As a general rule, an XML schema that is generated when the strict mode is elected will result in a stricter validation of messages than an XML schema that is generated when the lax mode is elected.

The method used by the black box to generate the output XML schema (or, more particularly, key fragments of the output XML schema) from the input custom message model and schema generation request is detailed in the description which follows.

FIG. 1 illustrates a first computer server 20 interconnected with a second computer server 40 by way of a communications network 30. Servers 20 and 40 may for example be computer servers from the IBM® iSeries™ line of servers employing IBM PowerAS processors. Network 30 may for example be a local area network, wide area network, the Internet or a wireless network.

Server 20 executes message broker software (not shown) to facilitate intercommunication between server 20 and server 40. The message broker software may for example be an instance of the IBM® WebSphere® Business Integration Message Broker software. The software converts messages which are represented in a first wire format at server 20 into a second wire format for communication to server 40. The message broker software is loaded into persistent memory at the server 20 from a computer program product 22 having a computer readable medium, which could be an optical or magnetic disk, tape, or chip for example.

In the present embodiment, the message broker software has been enhanced to be capable of generating XML schemas compliant with the W3C XML 1.0 schema recommendation which contain representations of logical model extensions and wire format specific rendering options which are not ordinarily supported in the standard W3C XML 1.0 schema recommendation, as will be described.

The message broker software utilizes a custom XML schema based message model 200 (FIG. 1) to support conversion of messages from one wire format to another. The message model 200 comprises a logical model and a physical model. The logical model defines, in a platform and programming language neutral manner, the logical structure of a message, which in the present example pertains to an employee record. The physical model defines the manner in which the message is represented in various wire formats. The physical model incorporates customizations comprising various logical model extensions and wire format specific rendering options which are not supported in the W3C XML 1.0 recommendation. These logical model extensions and rendering options are described in detail below.

Before run time, computer server 20 uses the custom message model 200 along with other operator-provided input to generate an XML schema 800. XML schema 800 is an alternative representation of the message model 200 which, unlike message model 200, is compliant with the W3C XML 1.0 recommendation. The operator-provided input is a request to generate an XML schema for a particular wire format (in this case, a wire format known as "XML1") in either a strict mode or a lax mode. As will be appreciated, it is the generation of the XML schema 800 that is the focus of the present description. The generated XML schema 800 is communicated in some fashion to computer server 40 (typically before run time), where it is stored in anticipation of run-time XML message traffic from the computer server 20.

At run time, computer server 20 receives an XML instance document 600 representing a message containing employee information in a particular (default) wire format, converts it to an XML instance document 700 representing the same message in the XML1 wire format (using the custom message model 200), and sends the document 700 to computer server 40 by way of network 30.

Thereafter, the other computer server 40 shown in FIG. 1 executes a W3C Standard Compliant XML Schema validator 42. A W3C Standard Compliant XML Schema Validator (or simply "standard schema validator") is software which uses as its input an XML schema and an XML instance document. The software is capable of determining, based on the XML schema, whether the XML instance document is valid (i.e. whether the instance document is concordant with the schema), provided that the received XML schema is compliant with an accepted standard. In the present case, the accepted standard is the W3C XML 1.0 recommendation. W3C Standard Compliant XML Schema validator 42 may for example be the XML Schema Quality Checker (SQC) from IBM@ or the "Online W3C XML Schema Validator". The computer server 40 uses the XML schema 800 to validate incoming XML message 700 at run time. The validated message is used by an application at computer server 40 (not shown) which expects to receive valid XML1 wire format messages.

Figure 2:
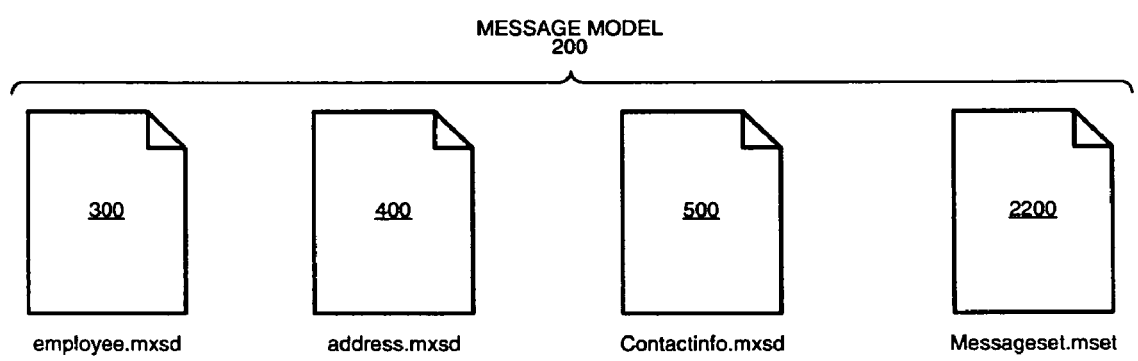
FIG. 2 illustrates a message model used by message broker software executing on one of the computer servers of FIG. 1.

FIG. 2 illustrates the message model 200 maintained at computer server 20 in greater detail. In the present embodiment, the logical and physical model components of the message model 200, when in serialized form, are combined in a set of three .mxsd files—an employee.mxsd file 300, an address.mxsd file 400, and a contactinfo.mxsd file 500—and a messageSet.mset file 2200. FIGS. 3A, 3B and 3C illustrate the employee.mxsd file 300 comprising message model 200. The employee.mxsd file 300 defines a complex type "EmployeeInfo" (line 9 of FIG. 3A to line 87 of FIG. 3C) and declares a global element "empInfo" of that type (see lines 88-95 of FIG. 3C). It also specifies that a physical message which will come into existence in the memory of computer server 20 at run time will be based on the "empInfo" global element (see lines 91-92 of FIG. 3C and further description below).

Various wire format specific rendering options defined in the physical model of message model 200 are represented within the employee.mxsd file 300, each dictating a particular method of rendering an XML element "on the wire" for a particular wire format. In accordance with the method described in the co-pending U.S. patent application "SINGLE FILE SERIALIZATION FOR PHYSICAL AND LOGICAL META-MODEL INFORMATION" Ser. No. 10/835,329, filed Apr. 29, 2004, which is hereby incorporated by reference hereinto, the wire format specific rendering options constructs are represented within appInfo annotations.

All of the wire format specific rendering options are applicable to either XML elements or XML element references. As is known in the art, XML elements may either be global or local. A global XML element is declared at the highest level within an XML schema, i.e., is created by a declaration that appears as a child of the schema element. A local XML element is declared at a lower level than a global XML element, e.g. within a complex type definition. An element reference is a reference to an XML element that is (necessarily) a global XML element. As will be described, all of the rendering options are applicable to element references, however, in terms of applicability to XML elements, one of the rendering options is applicable only to global XML elements and the remainder of the rendering options are applicable only to local XML elements.

A first wire format specific rendering option is illustrated at lines 14 and 15 of FIG. 3A. The rendering option takes the form of an xmlInclRep element with an attribute render="XMLAttribute" (and is thus referred to as the "XMLAttribute" rendering option, for convenience). This rendering option indicates that the containing message component (i.e. the "employeeType" element) is to be rendered on the wire as an attribute of another XML element, instead of as a local XML element of its own right as represented in the logical model of the message model 200. The "other XML element" for which the message component will be rendered as an attribute is any XML element having a complex type of which the message component forms a part. For example, in this case, where the message component (the "employeeType" element) forms part of the "EmployeeInfo" complex type (see line 9 of FIG. 3A), any XML element declared to be of type "EmployeeInfo", such as the "empInfo" element declared at line 88 of FIG. 3C, shall have the "employeeType" element rendered as an attribute because of the rendering option at lines 14 and 15. If the message component were contained in a group, the "other XML element" for which the message component will be rendered as an attribute is any XML element having a complex type whose definition contain a reference (i.e. a group reference) to that group.

The XMLAttribute rendering option includes an attribute messageSetDefaultRep="XML1" attribute which indicates that this rendering option governs only the XML1 wire format. That is, the element may be rendered differently for other wire formats. As will be seen, all of the wire format specific rendering options in the present embodiment have this attribute, i.e. pertain to the XML1 wire format. This is for clarity of illustration. In a more typical embodiment, wire format specific rendering options may be specified for a number wire formats.

The XMLAttribute rendering option may optionally include an attribute XMLname="<overridingname>" (not shown in FIG. 3A). When specified, this optional attribute dictates that a the containing message component (i.e. the "employeeType" element), when rendered on the wire as an attribute, is to have an overriding attribute name "<overridingname>" (with any text being substitutable for <overridingname>, provided the text constitutes a valid XML name). When this optional attribute is not specified, the rendered attribute name is the same as the original element name (i.e. the name is not overridden).

The XMLAttribute wire format specific rendering option is applicable to local elements (as shown in FIG. 3A) and element references. It is not applicable to global XML elements. Moreover, this wire format specific rendering option is understood to be applicable only to elements of simple type or to element references which reference (global) elements of simple type. This is because the rendering option specifies that the value of the element is to be rendered as a value of an attribute, which can only be of simple type.

A second wire format specific rendering option referred to as the "XMLElementAttrVal" rendering option is illustrated at line 31 of FIG. 3A to line 35 of FIG. 3B. This rendering option takes the form of an xmlInclRep element with attribute render="XMLElementAttrVal". This option indicates that the containing message component (i.e. the "firstName" element) is to be rendered on the wire as an XML element and that its value should be rendered as the value of an added attribute having a specified name. The valAttrName attribute to the XMLElementAttrVal rendering option is used to specify the name of the attribute (here, the name is simply set to "val"). A further attribute valAttrNameNSURI="http://www.ibm.com/employee" provides a namespace uniform resource identifier (URI) for the "val" attribute.

Like the first wire format specific rendering option, the second rendering option may optionally include an attribute XMLname="<overridingname>" (not shown in FIG. 3A or 3B). When specified, this optional attribute dictates that the containing message component (i.e. the "firstName" element), when rendered on the wire as an element, is to have an overriding element name "<overridingname>" (with any text again being substitutable for <overridingname>, provided the text constitutes a valid XML name).

Also, like the first rendering option, the second wire format specific rendering option is applicable to local elements and element references but is not applicable to global XML elements, and is understood to be applicable only to elements of simple type or to element references which reference (global) elements of simple type.

Additional examples of the XMLElementAttrVal wire format specific rendering options appear at lines 42 to 46 and 53 to 57 of FIG. 3B and pertain to the locally declared elements "middlename" and "lastname" respectively.

A further wire format specific rendering option referred to as the "XMLElementAttrID" rendering option is illustrated at lines 67 to 71 of FIG. 3C. This rendering option governs the rendering of the "address" element of the EmployeeInfo complex type when rendered in the XML1 wire format and takes the form of an xmlInclRep element with attribute render="XMLElementAttrID". The XMLElementAttrID rendering option indicates that the containing message component (i.e. the "address" XML element) is to be rendered on the wire as an XML element, but with an additional attribute of type string. The name of the additional attribute is stipulated by the attribute idAttrName, provided as part of the XMLElementAttrID rendering option. Here it is stipulated to be "country". The value of the additional attribute is stipulated by another rendering option attribute idAttrValue to be "Canada" (i.e. ""Canada""). The rendering option also includes an attribute idAttrNameNSURI="http://www.ibm.com/country" which provides a namespace uniform resource identifier (URI) for the additional attribute ("country"). For clarity, it is noted that the "address" element (line 64 of FIG. 3B) is of complex type "Address", and that the latter type is defined in the address.mxsd file 400 (FIG. 4).

Like the first two wire format specific rendering options, the third rendering option may optionally include an attribute XMLname="<overridingname>" (not shown). If specified, this optional attribute dictates that the containing "address" element will have an overriding valid XML element name "<overridingname>" when rendered on the wire in the XML1 wire format.

The XMLElementAttrID wire format specific rendering option is applicable to local elements and element references but is not applicable to global XML elements. More specifically, the rendering option is applicable to local elements of both simple and complex type, and to element references which reference (global) elements of simple or complex type.

The employee.mxsd file 300 also declares element "contactInfo" of type "ContactInfoType" and element "emergencycontactInfo" of type EmergencyContactInfoType", both of which types are defined in the contactinfo.mxsd file 500 of FIGS. 5A and 5B. The "contactInfo" and "emergencycontactInfo" elements are both local to the EmployeeInfo complex type.

Referencing FIGS. 5A and 5B, the contactinfo.mxsd file 500 includes a number of logical model extensions and wire format specific rendering options.

A first logical model extension comprising a composition attribute is shown at line 12 of FIG. 5A. The composition attribute has a value of "unorderedSet". This indicates that elements comprising the complex type "ContactInfoType" (i.e. the elements referenced at lines 16 to 19 of FIG. 5A) may occur in any order when transmitted on the wire. As logical model extensions are not specific to a wire format, this is applicable to all wire formats.

A second logical model extension comprising a content attribute is shown also at line 12 of FIG. 5A. The content attribute has a value of "closed". This value, which is the default value, indicates that the elements referenced at lines 16 to 19 of FIG. 5A should all appear in the message exactly as defined in the logical model of message model 200, in any wire format.

A third logical model extension comprising a content attribute is also shown at line 28 of FIG. 5A. The content attribute has a value of "openDefined". Because the containing entity in this case is a group (group "EmpergencyContactInfoGroup" declared at line 25 of FIG. 5A), this value indicates that, for all wire formats, any message or message component declared to have a complex type whose definition contains a reference to that group (i.e. a group reference to group "EmpergencyContactInfoGroup") can contain the elements of that group (i.e. the "personName" "personPhoneNo" and "cellPhoneNo" elements defined at lines 32, 40 and 48 of FIG. 5B) or any other elements which have been defined in the relevant message set. In the present example, this includes any elements declared in the employee.mxsd file 300, address.mxsd file 400, or contactinfo.mxsd file 500.

A first wire format specific rendering option is illustrated at lines 35 and 36 of FIG. 5B. This rendering option is referred to as the "XMLElement" rendering option as it may be characterized by a render="XMLElement" attribute. In the example at lines 43 and 44, the render="XMLElement" attribute is absent due to the fact that this rendering option is a default rendering option which is assumed when no "render" attribute is specified. The XMLElement rendering option dictates that a particular XML element is to be rendered on the wire as an XML element but with an overridden element name. This rendering option is equally applicable to local XML elements, global XML elements, and element references.

Another example of the XMLElement rendering option is illustrated at lines 51 and 52 of FIG. 5B.

It is noted that, when the XMLElement rendering option is applied to a global element referenced by an element reference having no specified wire format specific rendering option, when the element reference is rendered, the overriding name specified for the global element shall be used for the element reference even though no rendering option specifying an overriding element name has been specified for the element reference. It is further noted that, when this rendering option is applied to both an element reference and to the global XML element referenced by the element reference, and the overriding names specified by the two rendering options are different, when the element reference is rendered it shall have the overriding name specified for the element reference rather than the name specified for the global element (i.e. the overriding name specified for the element reference prevails). The notes in this paragraph apply to all XML wire format specific rendering options for which an overriding name may be specified.

Another example of the earlier described XMLAttribute wire format specific rendering option is illustrated at lines 43 and 44 of FIG. 5B. This rendering option is analogous to the one illustrated at lines 14 and 15 of FIG. 3A (described above), with the exception that this example includes an xmlName="emergencyPhoneNo" rendering option attribute which specifies an overriding name for the element when rendered as an attribute.

Another type of wire format specific rendering option, referred to as a "XMLElementAttrIDVAL rendering option" herein due to the fact that it is characterized by a render="XMLElementAttrIDVAL" rendering option attribute in the present embodiment, is not illustrated in FIGS. 3A to 3C, 4 or 5A to 5B. This rendering option dictates that a particular XML element is to be rendered on the wire as an XML element but with two additional attributes. The first attribute is an ID attribute of type string whose name and value can be specified within a rendering option attribute. The second attribute is a "val" attribute whose value will be set to the value of the XML element and whose name can be specified in another rendering option attribute. This rendering option is thus essentially a combination of the "XMLElementAttrID" rendering option and the "XMLElementAttrVAL" rendering option. The XMLElementAttrIDVal rendering option is applicable to local elements and element references but is not applicable to global XML elements. Moreover, it applies only to elements of simple type or to element references which reference global elements of simple type.

FIGS. 6 and 7 illustrate serialized XML instance documents 600 and 700 respectively based on the message model of FIG. 2. XML instance document 600 is an instance of an employee information message in a default XML wire format, while XML instance document 700 is an instance of the same message in "XML1" XML wire format. Unlike the message model 200, which is generated at tooling time, these instance documents are generated at run time.

Figure 8:
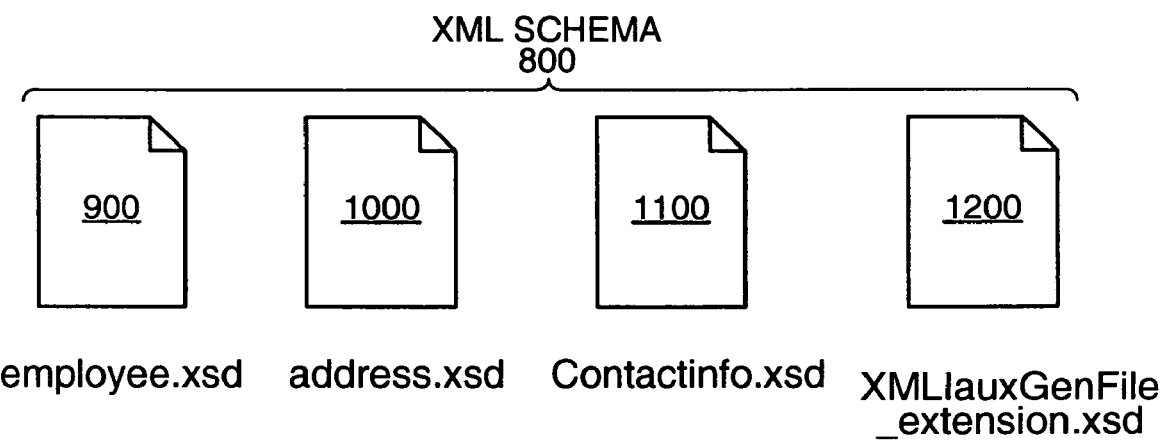
FIG. 8 illustrates a W3C recommendation compliant XML schema generated from the message model of FIG. 2 according to an embodiment of the present invention.

FIG. 8 illustrates a serialized XML schema 800. XML schema 800 is generated from the message model 200 of FIG. 2 at tooling time. XML schema 800 contains substantially the same information as message model 200, including representations of the logical model extensions and wire format specific rendering options of message model 200 described above. However, as will be appreciated, XML schema 800 is compliant with the "XML Schema 1.0" schema standard.

In overview, to facilitate the sending of messages having a wire format of XML1 to the computer server 40 at run time, the enhanced message broker software at server 20 processes the custom message model 200 at tooling time to generate the XML schema 800. The enhanced message broker software is the "black box", the message model 200 is the first input to the black box, the request to generate an XML schema for the XML1 wire format (which may be initiated by an operator of the message broker software) is the second input to the black box, and the XML schema 800 is the output of the black box. Logical model extensions and wire format specific rendering options in the schema 200 are rendered as XML fragments within the XML schema 800 in accordance with the XML Schema 1.0 standard. For clarity, the term "rendered" refers to creating an XML schema, and is distinct from the "rendering" of instance documents on the wire, which refers to instantiating instance documents of the XML schema for transmission as messages at run time. The generated XML schema 800 is communicated in some fashion to the computer server 40, which lacks message broker software and is incapable of understanding message model 200 in its custom form. The generated XML schema 800 complies with an XML schema 1.0 standard, which is recognized by a standard schema validator at the computer server 40.

At run time, when computer server 20 receives a message represented by XML instance document 600 in the default wire format, it converts the message to the XML1 wire format and sends the converted message (XML instance document 700) to the computer server 40. The computer server 40 uses standard schema validator 42 and the XML schema 800 to validate the XML instance document 700. Thus, the destination node is able to validate XML messages containing various customizations even in the absence of message broker software and without understanding the custom message model 200.

The generation of the XML schema 800 at tooling time is performed according to one of two modes: strict and lax. The strict and lax generation modes govern the manner in which the fragments of XML schema 800 which pertain to logical model extensions of the original message model are generated.

An XML schema 800 generated from a message model 200 using the strict mode will differ from an XML schema 800 generated from the same message model using the lax mode only to the extent of that the message model includes certain logical model extensions (e.g. content kind and composition kind logical model extensions associated with complex types, as described above). If the message model contains no logical model extensions, the generated schemas will be the same regardless of whether strict or lax mode has been elected.

The strict and lax modes do not have any bearing on the manner in which XML elements having wire format specific rendering options in the message model are generated. The XML schema fragments generated on the basis of wire format specific rendering options will be the same regardless of whether the strict mode or the lax mode has been elected. However, in the present embodiment it is only in the lax mode that logical model extensions affect the generation pattern for complex types and groups.

An XML schema 800 generated according to the strict mode can be used at run time by the server 40 to validate messages in a strict fashion, i.e., more strictly than the validation performed with typical message broker software, with rigid enforcement of message structure and content. Strict validation mode is the default mode in the present embodiment.

An XML schema 800 generated according to the lax mode, on the other hand, can be used at run time by the server 40 to validate messages in a lax fashion, i.e., less strictly than the validation performed with typical message broker software. This mode may be chosen when some fragments of an instantiated message may at run time have optional extra content unknown at design/modeling time (e.g. additional XML elements or attributes), yet it is nevertheless desired to validate the message. The lax mode also facilitates future message enhancements as it permits continued validation of messages at run time even when the messages have been enhanced since the XML schema 800 was generated.

It is noted that the generation of W3C recommendation compliant .xsd files according to the present invention may entail the loading of .mxsd message model files into memory, modification of the loaded .mxsd files, and storing of the modified .mxsd files as W3C recommendation compliant .xsd files, rather than generation of the .xsd files from scratch, e.g. for reasons of efficiency.

Operation of the present embodiment is illustrated in FIGS. 13, 14A, 14B, 15A, 15B, 16A, 16B, and 17 to 21, with additional reference to FIGS. 1, 3A to 3C, 4, 5A, 5B, 6, 9A to 9C, and 10 to 12.

As noted in the overview above, at tooling time the message broker software at server 20 loads various files comprising message model 200 (i.e. the employee.mxsd file 300, address.mxsd file 400 and contactinfo.mxsd file 500 of FIGS. 3A to 3C, 4 and 5A and 5B) into memory and parses them in order to generate XML schema 800. Operation for generating XML schema 800 is illustrated in FIGS. 13 to 21 and is described below. The resultant schema 800 is illustrated in greater detail in FIG. 8.

As shown in FIG. 8, XML schema 800 comprises four .xsd files: an employee.xsd file 900, an address.xsd file 1000, a contactinfo.xsd file 1100, and an XMLlauxGenFile_extension.xsd file 1200. The employee.xsd file 900, address.xsd file 1000, and contactinfo.xsd file 1100 correspond generally to the employee.mxsd file 300, address.mxsd file 400, and contactinfo.mxsd file 500 (respectively) illustrated in FIG. 2. The XMLlauxGenFile_extension.xsd file 1200 is an extension file generated automatically during the creation of XML schema 800, as will be described below.

Employee.xsd file 900, address.xsd file 1000, and contactinfo.xsd file 1100 are shown in greater detail in FIGS. 9A to 9C, 10 and 11 respectively. These files are illustrated as having been generated according to the strict mode. XML schema files 900, 1000 and 1100 incorporate various XML schema fragments generated from either wire format specific rendering options or logical model extensions contained within message model 200. Certain of these XML schema fragments are described below in the context of describing operation for the generation of XML schema 800.

FIGS. 13, 14A, 14B, 15A, 15B, 16A, 16B and 17 illustrate operation at tooling time for the rendering of XML elements according to various wire format specific rendering options. In the present embodiment, each of the described rendering options is specified for the XML1 wire format, thus the resultant rendered XML schema 800 will be useful for validating messages in the XML1 wire format only.

Figure 13:
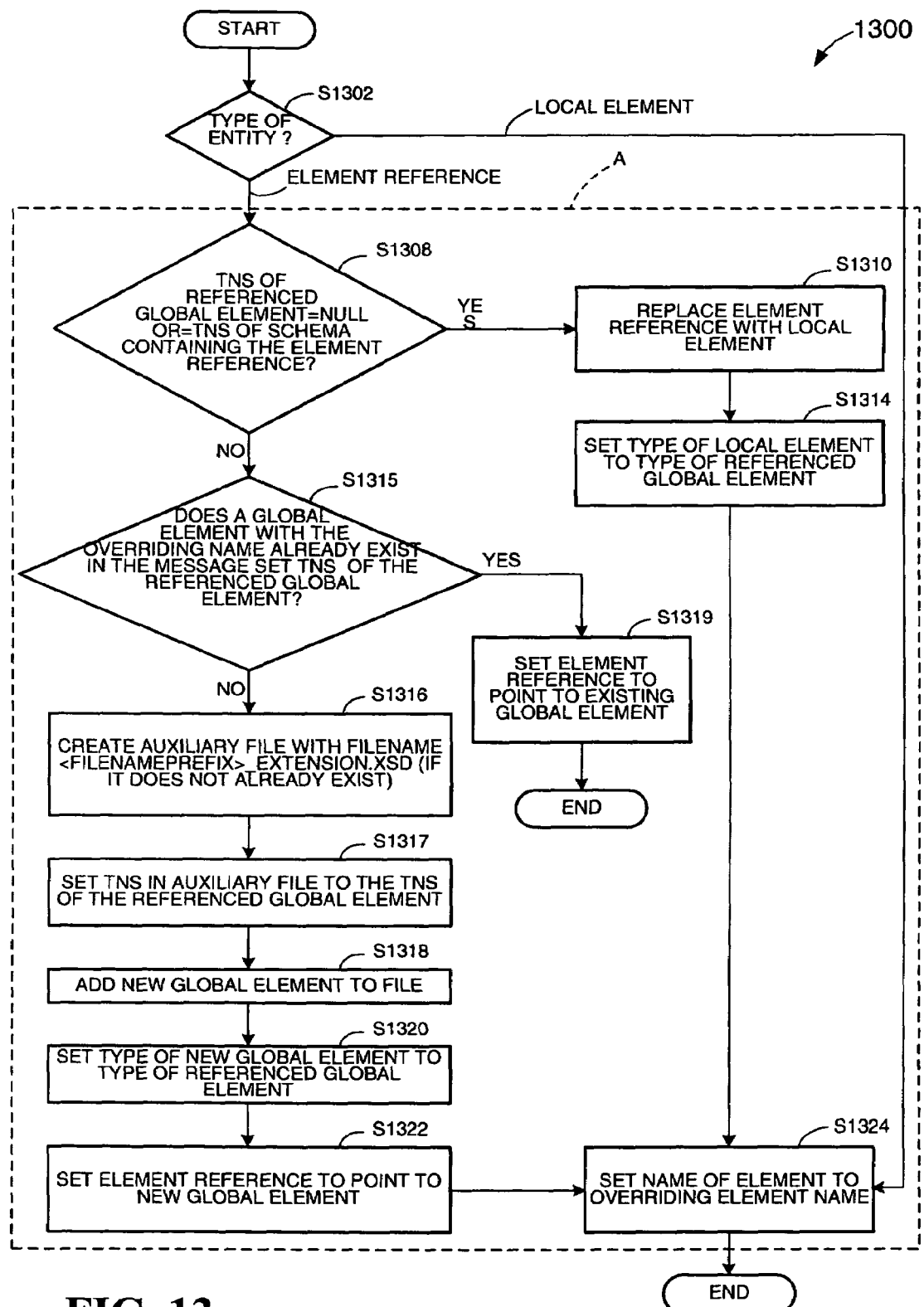
FIG. 13 is a flowchart illustrating operation for rendering an XML schema fragment according to one wire format specific rendering option.

Referring first to FIG. 13, operation 1300 for rendering an XML schema fragment according to the XMLElement wire format specific rendering option is shown. Operation 1300 is engaged when a rendering option is encountered which dictates that a particular XML element is to be rendered on the wire as an XML element but with an overriding element name. Operation 1300 will be described in reference to the rendering of the "personName" element illustrated at lines 32 to 39 of the contactInfo.mxsd file 500 (FIG. 5B) and to the rendering of the "cellPhoneNo" element reference illustrated at lines 48 to 55 of the same file as W3C recommendation compliant representations of XML elements with overridden XML names in a file, contactInfo.xsd 1100 (FIG. 11). It is noted that the rendering option attribute render="XMLElement", which is characteristic of the XMLElement rendering option, is not included for the "personName" element or "cellPhoneNo" element because, in the present example, it is the default rendering option which is assumed when a particular wire format specific rendering option is not specifically indicated.

If it is determined that the XML entity is a local element (S1302), as in the case of the "personName" element (FIG. 5B), the element is simply rendered in the XML schema 800 with its name set to the overriding element name (S1324) as shown at line 23 of FIG. 11, thus concluding operation 1300.

If it is instead determined that the XML entity is an element reference (S1302), as in the case of the "cellPhoneNo" entity (FIG. 5A), a determination is made as to whether the target namespace (TNS) of the referenced global element is null or is equal to the TNS of the schema containing the element reference (S1308).

If either of these conditions is true, the element reference namespace and global element namespace are the same and a local version of the global element can be created in place of the element reference (with suitable modifications, as will be described). The global element is left in place, in case any other element references refer to that element. Specifically, the element reference is replaced with a local element (S1310), the type of the new local element is set to the type of the referenced element (S1314), and the element name is set to the overriding element name (S1324).

In the case of the "cellPhoneNo" entity, the first condition is false but the second is true. That is, the TNS of the referenced "cellPhoneNo" global element (i.e. "contactInfo", or "http://www.ibm.com/employee"), is not null but it is it equal to the TNS of the schema containing the reference (i.e. the "targetNamespace" schema defined at line 2 of the contactInfo.mxsd file 500 (FIG. 5A). Therefore, in accordance with S1310, S1314 and S1324, the element reference is replaced with a local element with the same type (string) as the referenced global element (the "cellPhoneNo" element at line 8 of FIG. 5A) and with overriding name "emergencyCellPhone" as specified in the rendering option attribute at line 52 of FIG. 5B.

If neither condition of S1308 is true, the element reference namespace and global element namespace are different. In this case the global element is left as a global element, but to avoid the possibility that modifying the global element (e.g. with overriding suitable modifications, as will be described) will detrimentally affect any other element references referring to the global element, the global element is reproduced as a new global element with suitable modifications.

Specifically, a determination is made as to whether a global element with the overriding name already exists in the TNS of the message set of the referenced global element (S1315). In the example, a determination would be made as to whether a "emergencyCellphone" global element exists in the "SchemaGen" message set comprised of employee.mxsd file 300, address.mxsd file 400, and contactinfo.mxsd file 500 or any auxiliary .xsd files created during schema generation.

If the determination of S1315 is made in the positive, the "new" global element already exists, possibly due to the fact that another, earlier processed element reference which referenced the same global element as the current element reference had an "XMLElement" rendering option specifying the same overriding element name, resulting in the generation of the new global element with the overriding name. In this case the element reference is set to point to the existing global element (S1319). That is, rather than creating a new global element, the existing global element is used to avoid redundancy. Operation 1300 then terminates.

If the determination of S1315 is made in the negative, an auxiliary .XSD file is created if it does not already exist (S1316), and the TNS of the auxiliary file is set to the TNS of the referenced global element (S1317). A new global element is added to the file (S1318) with its type being set to the type of the referenced global element (S1320). The element reference is set to point to the new global element (S1322) and the name of the new global element is set to the overriding element name (S1324). Operation 1300 thus terminates.

Although not illustrated in FIG. 13, operation for rendering an XML schema fragment according to the XMLElement wire format specific rendering option applied to a global XML element will, with appropriate adjustments, be similar to that shown in FIG. 13 for a local XML element.

Figure 14A:
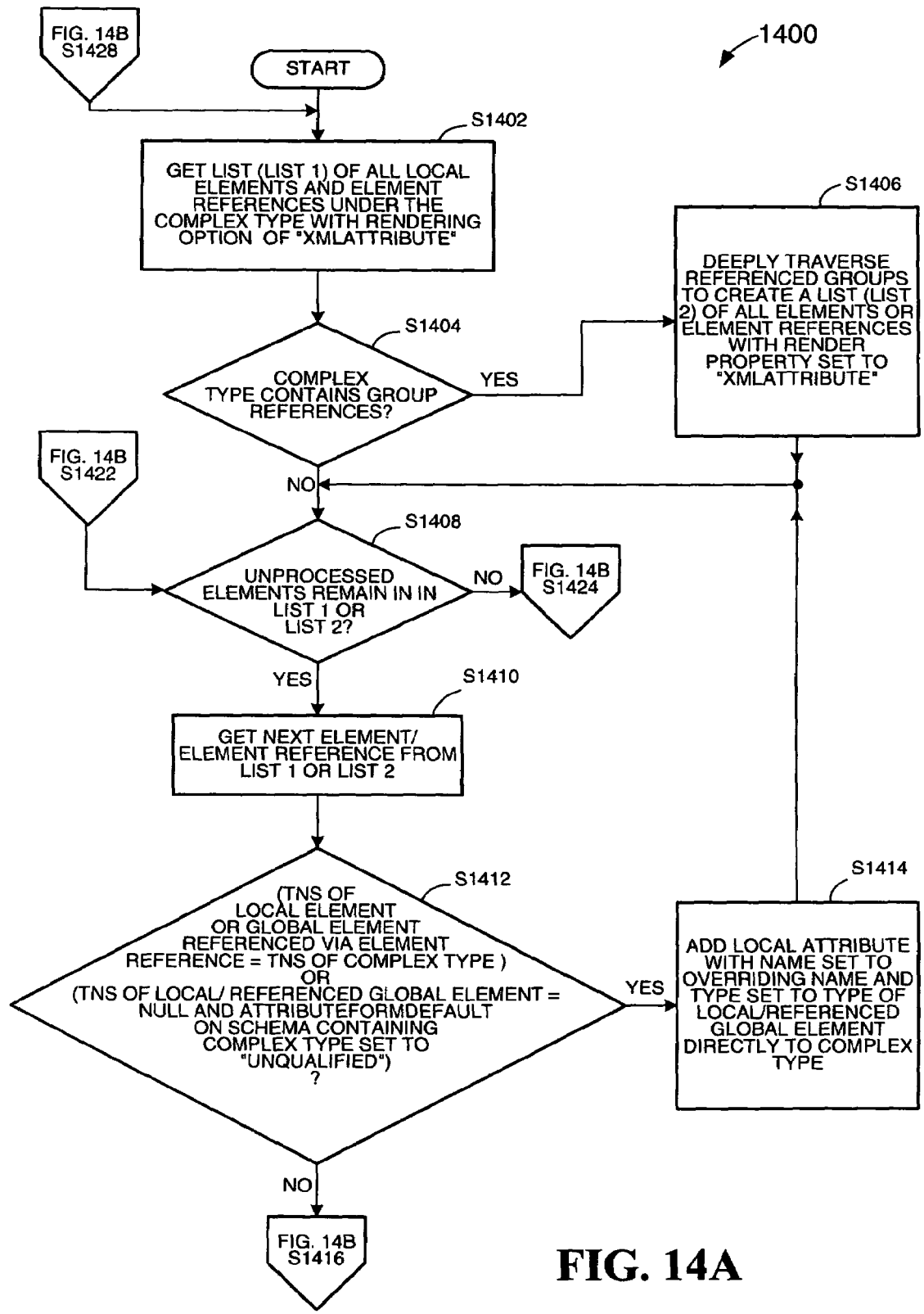
FIGS. 14A and 14B contain a flowchart illustrating operation for rendering an XML schema fragment according to another wire format specific rendering option.
Figure 14B:
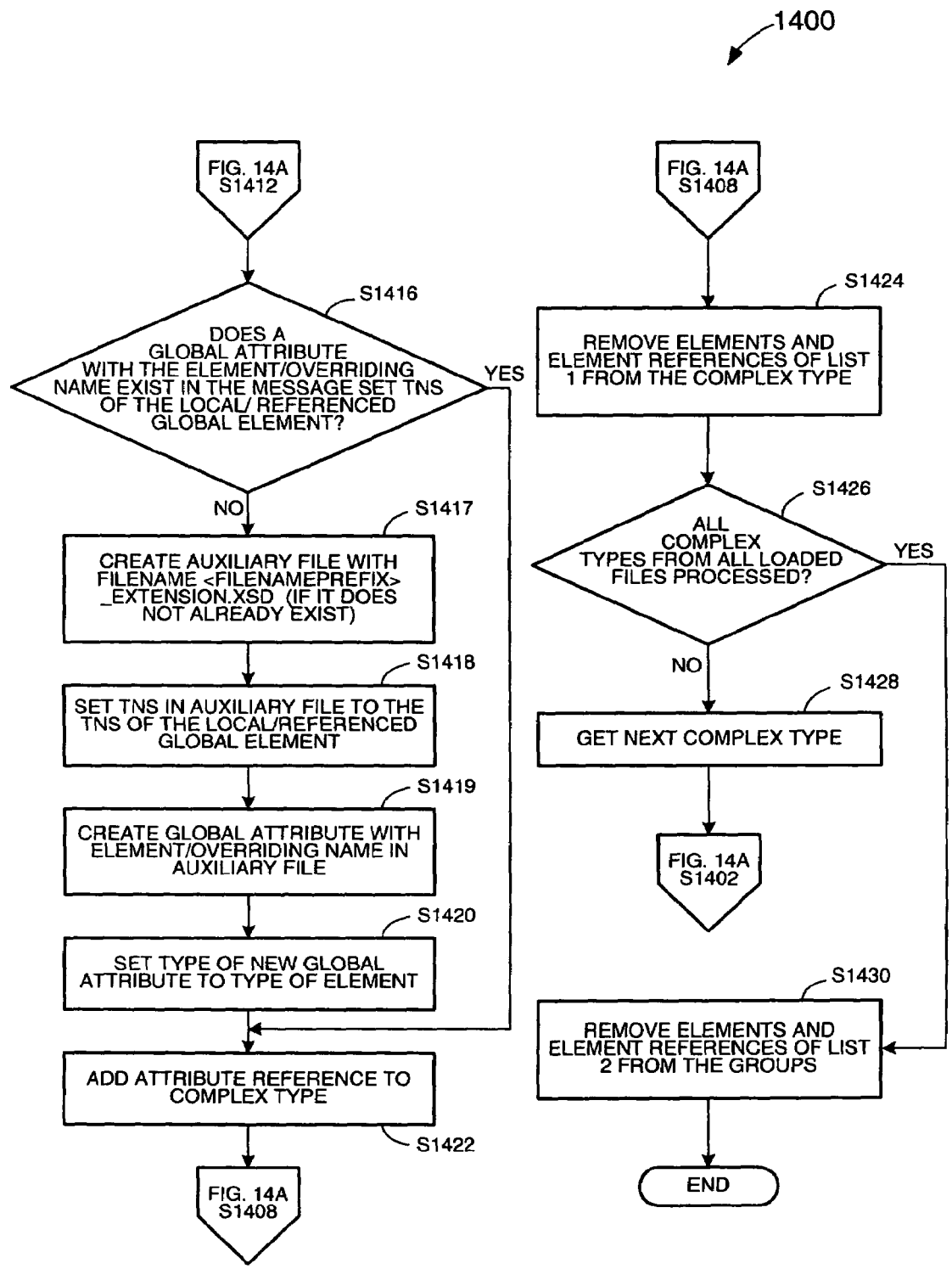

Referring next to FIGS. 14A and 14B, operation 1400 for rendering an XML schema fragment according to the XMLAttribute wire format specific rendering option is shown. Operation 1400 is engaged when a rendering option is encountered which dictates that a particular XML element is to be rendered on the wire as an attribute of another XML element having a complex type of which the message component forms a part, instead of as an XML element of its own right.

Operation 1400 is described below in reference to the rendering of the XML schema fragment at lines at lines 69 to 76 of employee.xsd file 900 (FIG. 9C) from the "employeeType" XML element illustrated at lines 11 to 24 of the employee.mxsd file 300 (FIG. 3A).

For clarity of the below description, it is noted that an XML element for which the "XMLAttribute" wire format specific rendering option has been specified will necessarily be contained in a complex type or a group.

Initially, a list (referred to as "list 1") is created from the set of all local elements and element references (generally referred to as "entities") under the complex type containing the XML element which have an XMLAttribute rendering option indicating that the entity should be rendered as an attribute (S1402 of FIG. 14A). To be included in list 1, the containment of the entity should be at the same level as the XML element to be rendered as an attribute. List 1 may be determined through recursion.

In the case of the "employeeType" element, the containing complex type (declared at line 9 of FIG. 3A) does not contain any other local elements or element references whose render attribute has been set to "XMLAttribute", therefore list 1 in the present embodiment contains only one entry, namely, the "employeeType" element.

Next it is determined whether the containing complex type contains any group references (S1404). If any group references are found, the referenced groups are deeply traversed to create a set or list ("list 2") of all elements or element references whose render attribute has also been set to "XMLAttribute" (S1406).

In the case of the "EmployeeInfo" complex type, no group references are contained, therefore list 2 in the present embodiment is empty.

For each entity from list 1 or list 2 (S1408, S1410), a determination is made as to whether the target namespace of the local element or (in the case of an element reference) global element referenced through the element reference is the same as the target namespace of the complex type or whether the local element or referenced global element belongs to chameleon namespace (i.e. is null) and the AttributeFormDefault attribute of the schema containing the complex type is set to "unqualified" (S1412). For clarity, the terms "chameleon namespace" and "AttributeForm Default" are described in Appendix I and are known to those skilled in the art.

For the sole entry of list 1 in the present example, namely the "employeeType" element, it is determined in S1412 that the TNS of the local element (i.e. the employeeType element at line 11 of FIG. 3A) is null and that the AttributeForm Default attribute of the schema containing the complex type is set to "unqualified", which is the default setting. Accordingly, a local attribute is added directly to the EmployeeInfo complex type of XML schema 800 (at lines 69 to 76 of FIG. 9C) and with its name set to the overriding name specified in the XMLname rendering option attribute and its type set to the type of the local element/referenced global element (S1414). This is illustrated at lines 69 to 76 of FIG. 9C. Because the XMLInclRep element (lines 14 and 15 of FIG. 3A) lacks an overriding XML name attribute in this example, the name of the added attribute is set by default to the name of the local element, i.e. "employeeType" (line 69 of FIG. 9C). The type of the attribute is set to simple type (line 70 of FIG. 9C) based on the fact that the "employeeType" element is of simple type (see line 18 of FIG. 3A).

If the sole entity in list 1 had not met either of the two conditions of S1412, a determination would have been made as to whether a global attribute having the element name "employeeType" (or, had an overriding name been specified, having the overriding name) exists in the message set target namespace of the local element (or, had the entity been an element reference, in the message set TNS of the referenced global element) (S1416).

If the determination made in S1416 is in the positive, an attribute reference is added to the complex type (S1422— FIG. 14B). Otherwise, before an attribute reference is added to the complex type (S1422), an auxiliary .XSD file is created (if it does not already exist) (S1417), the TNS of the auxiliary file is set to the TNS of the local element/referenced global element (S1418), a new global attribute having the element name or a specified overriding name is added to the file (S1419), and the attribute type is set to the type of the element (S1420).

In view of the fact that no unprocessed elements remain in either of list 1 or list 2 (S1408—FIG. 14A), each element and element reference of list 1 is removed from the containing complex type in the relevant .mxsd file (S1424—FIG. 14B). For clarity, removal of each element and element reference is only required in the case in which the source .mxsd files have been loaded into memory and are being modified to generate the desired W3C recommendation compliant XML schema fragment. In the event that an XML schema fragment is being generated from scratch, such removal would of course be unnecessary. Note that the elements and/or element references from list 2 are not removed because other complex types having groupRefs pointing to the same groups could exist (see, e.g., group reference at line 18 of FIG. 11 which remains after processing of the XMLAttribute rendering option at line 43 and 44 of FIG. 5B).

If all complex types from all of the loaded files (i.e., all complex types containing an XML element for which the "XMLAttribute" wire format specific rendering option has been specified in any .mxsd files that are presently loaded into memory for .xsd file generation) are not yet been processed (S1426), processing continues at S1428 with the next complex type. Otherwise, the elements and/or element references of list 2 are removed from the relevant groups (S1430) since the elements/element references have now been "converted" to attributes. This removal is preferably done just before the generated files are saved. Operation 1400 is thus concluded.

Referring to FIG. 15, operation 1500 for rendering an XML schema fragment according to the XMLElementAttrID third wire format specific rendering is shown. Operation 1500 is engaged when a rendering option is encountered which dictates that a particular XML element is to be rendered on the wire as an XML element but with an additional attribute of type string having a specified name and a specified value.

Operation 1500 will be described in reference to the rendering of the "address" element illustrated at lines 64 to 74 of the employee.mxsd file 300 (FIGS. 3B and 3C) as an XML Schema 1.0 standard compliant representation of the element with an additional attribute as shown in files employee.xsd file 900 and XMLlauxGenFile_extension.xsd 1200 (FIG. 12).

If it is initially determined that the XML entity for which the rendering option has been specified is a local element (S1502), the element is simply rendered in the XML schema 800 with its name set to the name of the element or the overriding element name (if one is specified) (S1524). In the case of the "address" element (FIGS. 3B and 3C), which is a local element with no specified overriding name, the element is rendered with its original name as shown at line 48 of FIG. 9B.

If it is instead determined that the XML entity is an element reference (S1502), operation in section A (marked with a dotted outline in FIG. 15A) is performed. Section A of FIG. 15A (S1508, S1510, S1514, S1515, S1516, S1517, S1518, S1519, S1520, S1522 and S1524) is analogous to section A of FIG. 13, described above, except that in the case of an XMLElementAttrID rendering option it is possible for an element not to have an overriding name (e.g. see S1524).

Figure 15A:
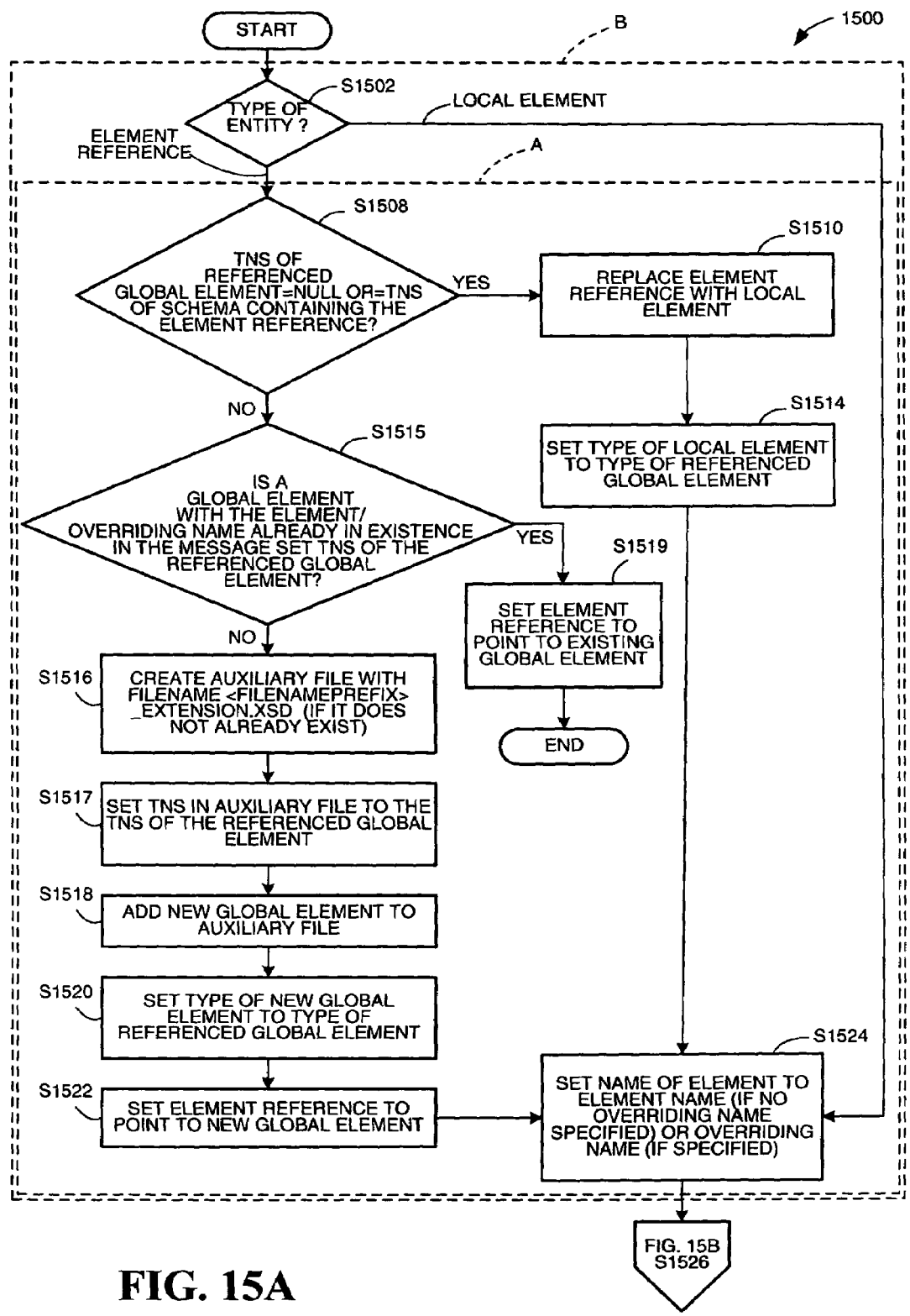
FIGS. 15A and 15B contain a flowchart illustrating operation for rendering an XML schema fragment according to yet another wire format specific rendering option.
Figure 15B:
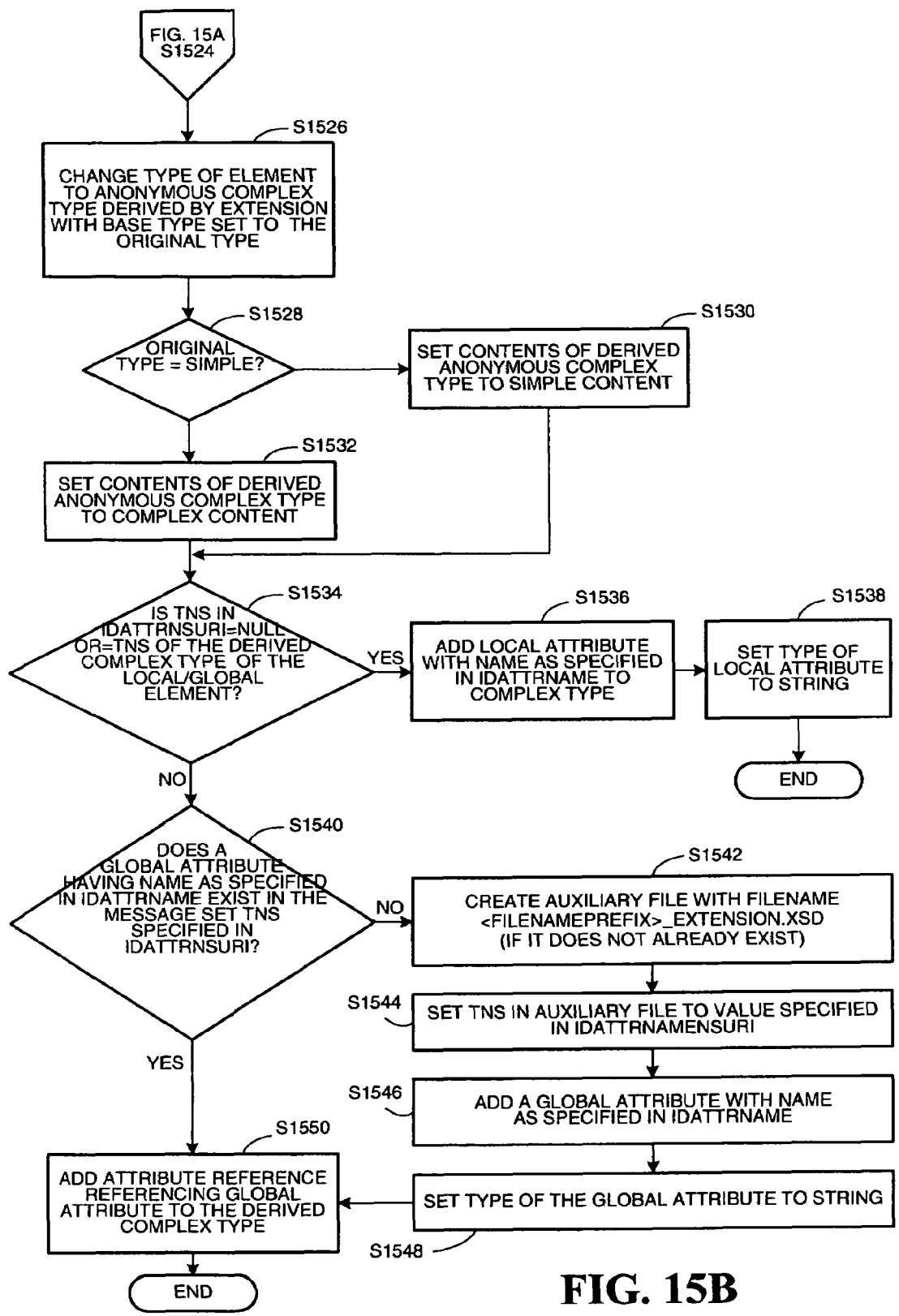

When the operation in section A of FIG. 15A is completed, the type of the local element/referenced global element is changed to anonymous complex type derived by extension with the base type set to the original type (S1526—FIG. 15B). The purpose of this change is to allow additional elements or references to effectively be added to the complex type (by way of type derivation). In the case of the "address" element of the present example, this is illustrated at lines 49 to 55 of FIG. 9B. If the original type of the element is simple (S1528), the contents of the anonymous complex type are set to simpleContent (S1530), otherwise the contents of the anonymous complex type are set to complexContent as in the present example (at line 50 of FIG. 9B).

Next, an assessment is made as to whether the namespace identified in the idAttrNameNSURI rendering option attribute is null or is equal to the target namespace of the derived complex type of the local element/referenced global element (S1534).

If this assessment is made in the positive, the additional attribute's target namespace is the same as the target namespace of the complex type of the local element/referenced global element namespace, therefore the attribute can be added directly to the anonymous complex type. A local attribute with a name as specified in the idAttrName rendering option attribute is added to the anonymous complex type (S1536), and the type of the attribute is set to "string" (S1538), thus concluding operation 1500.

In the case of the "address" element, the target namespace identified in the idAttrNameNSURI rendering option attribute is "http://www.ibm/com/country" (see line 68 of FIG. 3C) while the TNS of the complex type "Address" is "http://www.ibm/com/address" (see line 64 of FIG. 3B), thus the assessment of S1534 is made in the negative.

In this case a further determination is made as to whether a global attribute having the name as specified in the idAttrName rendering option attribute (i.e. "country") exists in the message set TNS specified in the idAttrNameNSURI rendering option attribute (S1540) (possibly due to the fact that another, earlier processed element reference also had an XMLElementAttrID rendering option which specified the same TNS in its idAttrNameNSURI rendering option attribute as the TNS specified by the idAttrNameNSURI of the current rendering option and the same name for the additional attribute, causing the earlier generation of the additional (global) attribute of the same name in the message set TNS).

If the determination of S1540 is made in the negative, an auxiliary .XSD file with a filename <filenameprefix>_extension.xsd is created, if it does not already exist (S1542), and the TNS of the auxiliary file is set to the value specified in the idAttrNameNSURI rendering option attribute (S1544). A new global attribute as specified in idAttrName is added to the file (S1546) with its type being set to string (S1548). Finally, an attribute reference is added to the derived complex type (S1550), and operation 1500 concludes.

In the case of the "address" element of the present example, the determination of S1540 is made in the negative, therefore an auxiliary file is created in accordance with S1542. In the present embodiment, a convention is adopted whereby <filenameprefix> is set to the XML wire format layer name plus "auxGenFile", thus the generated filename is "XMLlauxGenFile_extension.xsd". The generated XMLlauxGenFile_extension.xsd file is illustrated in FIG. 12 at 1200. Of course, file creation is unnecessary if the file is already in existence, as new information may simply be written to the existing file. The auxiliary file is populated (as shown in FIG. 12) according to S1544 and S1546, and an attribute reference is added to the Address type (at line 52 of FIG. 9B) in accordance with S1550. Operation 1500 is thus concluded.

If the determination of S1540 is made in the positive, creation and population of the auxiliary file is unnecessary; an attribute reference would simply be added to the derived complex type (S1550) and operation 1500 concluded.

Turning to FIG. 16, operation 1600 for rendering an XML schema fragment according to the XMLElementAtrVAL wire format specific rendering option is shown. Operation 1600 is engaged when a rendering option is encountered which dictates that a particular XML element is to be rendered on the wire as an XML element and that its value should be rendered as an attribute with a specified name.

Operation 1600 will be described in reference to the rendering of the "firstname" element illustrated at lines 28 to 38 of the employee.mxsd file 300 (FIGS. 3A and 3B) as an XML Schema 1.0 standard compliant representation of an XML element whose value is rendered as an attribute in the corresponding employee.xsd file 900 (at lines 18 to 26 of FIG. 9A).

Figure 16A:
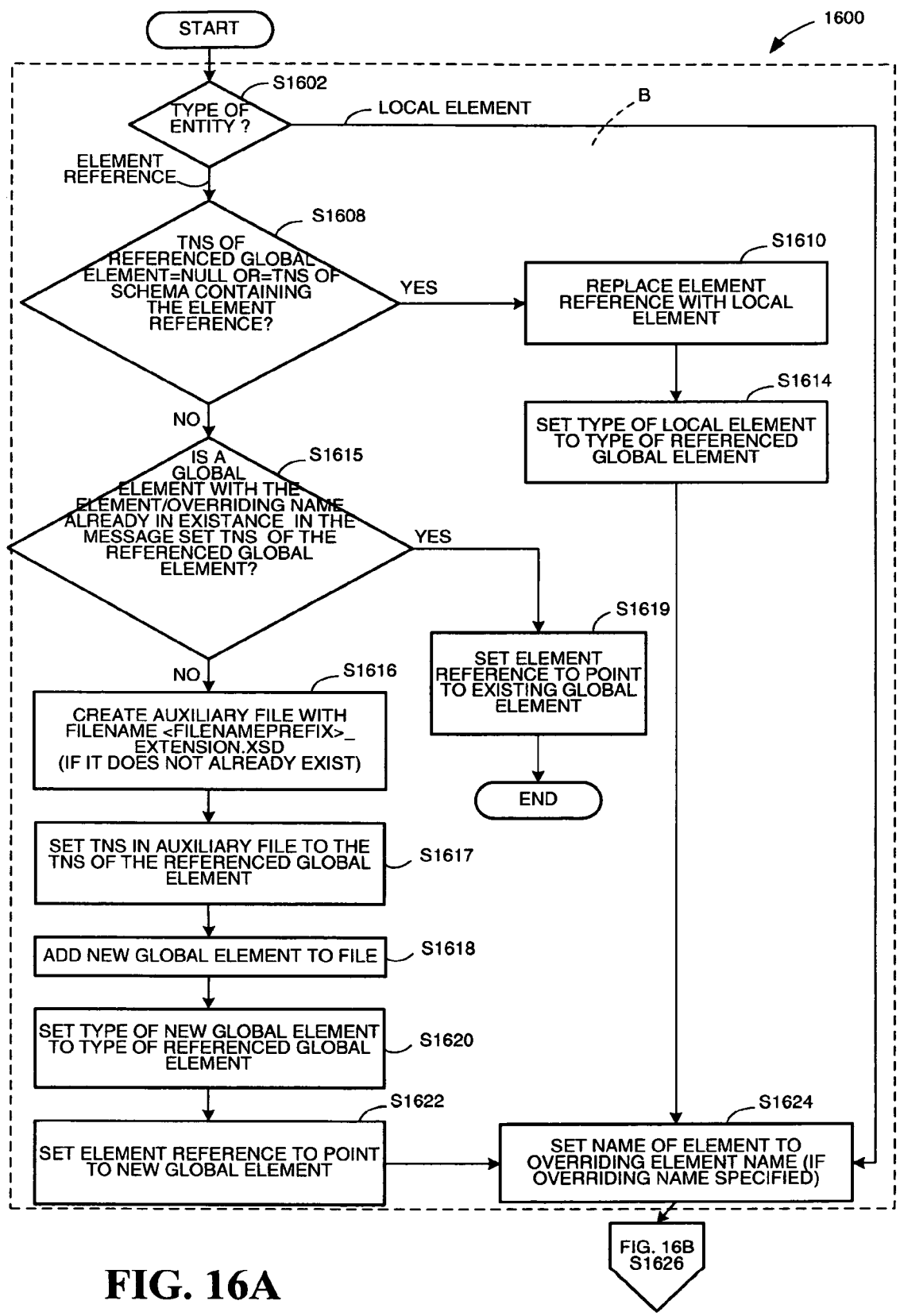
FIGS. 16A and 16B contain a flowchart illustrating operation for rendering an XML schema fragment according to still another wire format specific rendering option.

Operation 1600 begins with the operation in section B (marked with a dotted outline in FIG. 16A). Section B of FIG. 16A (S1602, S1608, S1610, S1614, S1615, S1616, S1617, S1618, S1619, S1620, S1622 and S1624) is analogous to section B of FIG. 15A. In the case of the "firstname" local element with no specified overriding name, this operation follows S1602 and S1624.

Figure 16B:
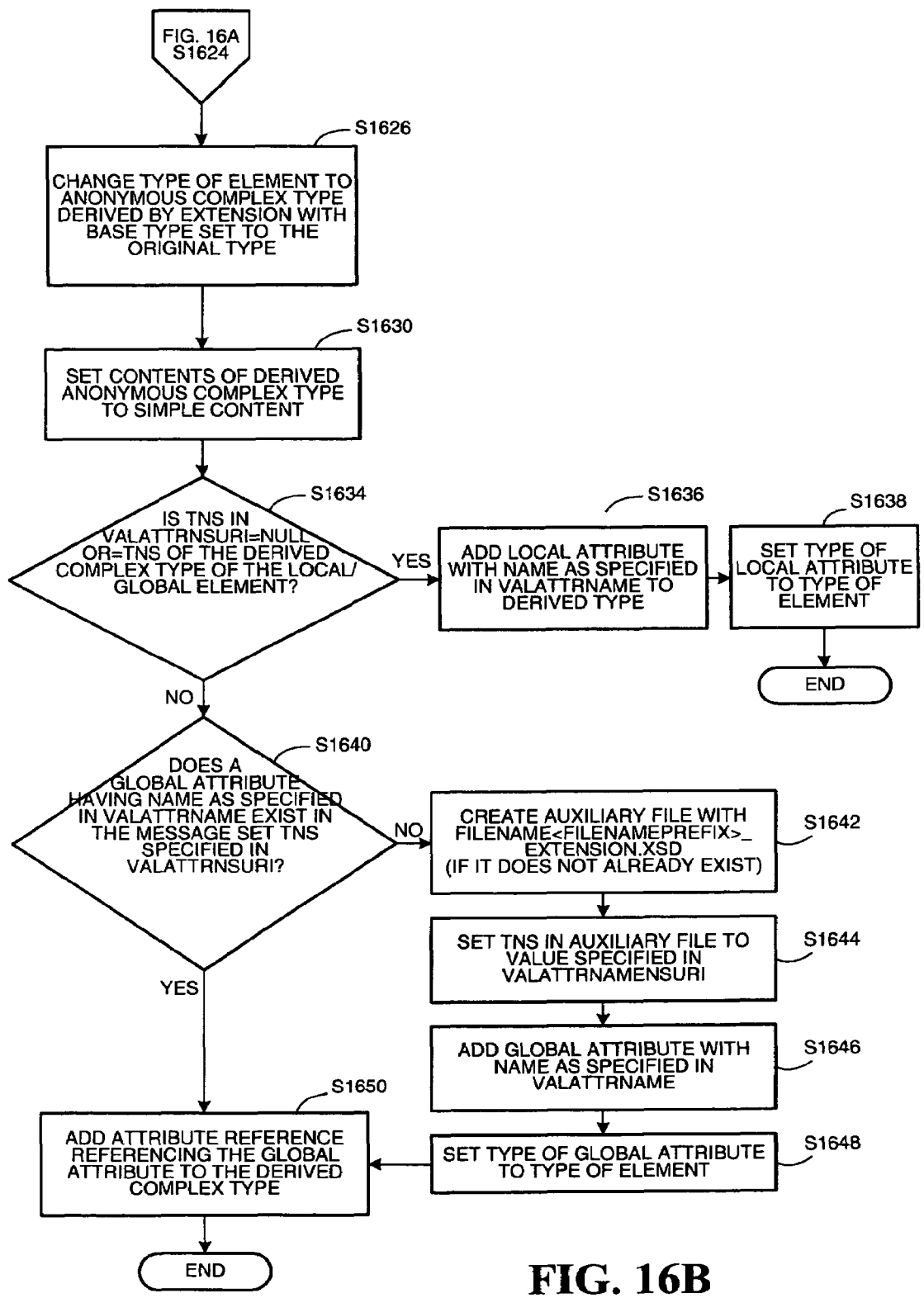

When the operation in section B of FIG. 16A is completed, the type of the local element/referenced global element is changed to anonymous complex type derived by extension with the base type set to the original type (S1626—FIG. 16B). In the case of the "firstname" element of the present example, the result is illustrated at lines 19 to 25 of FIG. 9A. The contents of the anonymous complex type are set to simpleContent (S1630) (see line 20 of FIG. 9A).

Next, an assessment is made as to whether the target namespace identified in the valAttrNameNSURI rendering option attribute is null or is equal to the target namespace of the derived anonymous complex type of the local element/referenced global element (S1634).

If this assessment is made in the positive, a local attribute with a name specified in the valAttrName rendering option attribute is added to the complex type (S11636), and the type of the attribute is set to the type of the original element (S1638). Of course, the value of the attribute, which should be the value of the local element/referenced global element, is not presently set, because the value of the local element/referenced global element is not known until run time.

In the case of the "firstname" element, the target namespace identified in the valAttrNameNSURI rendering option attribute ("http://www.ibm/com/employee") is the same as the TNS of the derived complex type, resulting in a local attribute named "val" with type "string" at line 22 of FIG. 9A. Operation 1600 is thus concluded.

If the assessment of S1634 is made in the negative, a further a determination is made as to whether a global attribute having the name as specified in the valAttrName rendering option attribute (i.e. "val") exists in the message set TNS specified in the valAttrNameNSURI rendering option attribute (S1640).

If the determination of S1640 is made in the negative, an auxiliary .XSD file with a filename <filenameprefix>_extension.xsd is created, if it does not already exist (S1642), and the TNS of the auxiliary file is set to the value specified in the valAttrNameNSURI rendering option attribute (S1644). A new global attribute as specified in valAttrName is added to the file (S1646) with its type being set to the type of the original element (S1648). Finally, an attribute reference is added to the derived complex type (S1650), and operation 1600 concludes.

If the determination of S1640 is instead made in the positive, creation and population of the auxiliary file is unnecessary; an attribute reference would simply be added to the derived complex type (S1650) and operation 1600 concluded.

The generation of each of the "middlename" and "lastname" elements in the employee.xsd file 900 (shown at lines 27 to 35 and 36 to 44, respectively, of FIGS. 9A and 9B) is similarly governed by operation 1600 of FIG. 16, since each of these XML elements also specifies an XMLElementAttrVal rendering option for the XML1 wire format.

Figure 17:
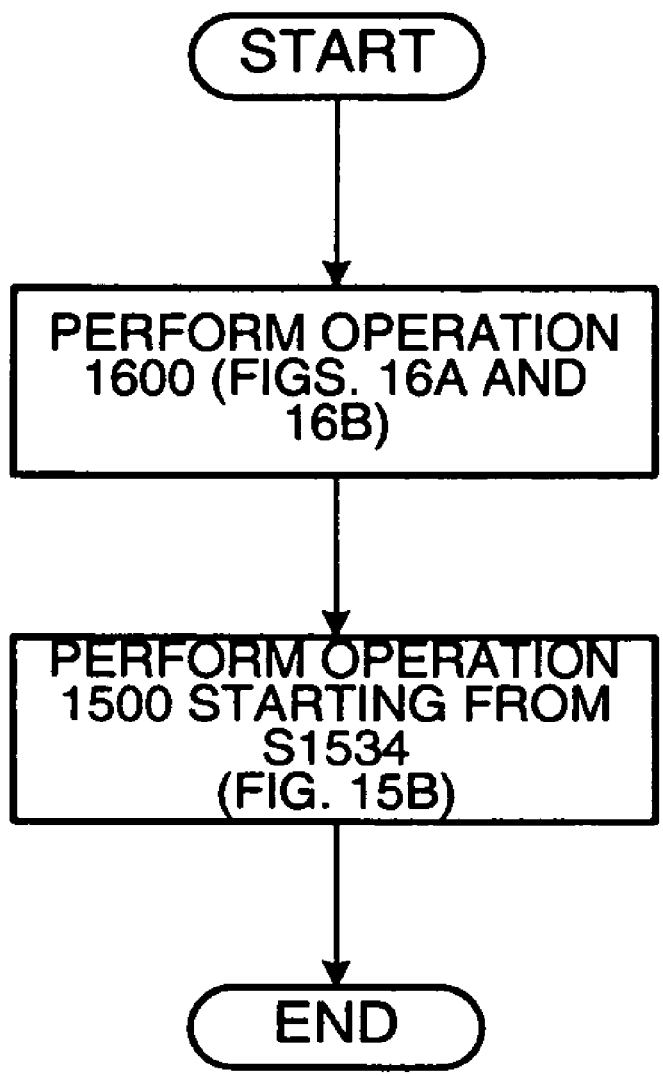
FIG. 17 is a flowchart illustrating operation for rendering an XML schema fragment according to yet another wire format specific rendering option.

Referring to FIG. 17, operation 1700 for rendering an XML schema fragment according to the XMLElementAttrIDVAL wire format specific rendering option is shown. Operation 1700 is engaged when a rendering option is encountered which dictates that a particular XML element is to be rendered on the wire as an XML element but with an additional attribute having a specified name, specified value and an optionally specified TNS, and that the value of the XML element is to be rendered as the value of another attribute having a specified name (which by default is set to "val"), and, optionally, a TNS for said another attribute.

The XMLElementAttrIDVAL rendering option is a combination of the "XMLElementAttrID" and "XMLElementAttrVAL" rendering options and described above. Accordingly, operation 1700 combines operation 1600 and a portion of operation 1500.

More specifically, operation 1600 of FIGS. 16A and 16B are performed (S1702). This results in the addition of an attribute whose value is set to the value of the original local element or referenced global element, as previously described. Thereafter, operation 1500 is performed starting at S1534 (FIG. 15B), which results in the addition of an attribute of type string. Operation at S1502 to S1524 is not performed to avoid redundancy with S1602 to S1624. Operation 1700 is thus concluded.

The effect of the above described examples of XML1 wire format specific rendering options on the rendering of messages at run time may best be appreciated through comparison of the instance document 600 of FIG. 6 representing a message in the default XML wire format against the instance document 700 of FIG. 7 representing a message in the "XML1" XML wire format.

Operation at tooling time for rendering various logical model extensions is described with reference to FIGS. 18 to 20. FIGS. 18 to 20 illustrate XML schema fragment patterns generated from logical model extensions pertaining to complex types or groups in the lax mode. The XML patterns shown in FIGS. 18 to 20 are not complete schemas but rather simply illustrate the structure of the generated XML schema fragments as generated from certain logical model extensions for W3C recommendation compliance.

Referring first to FIG. 18, an XML schema fragment pattern 1800 for rendering an XML element generically named "xmlNameOfElement" having a complex type with a content kind attribute set to the value "open" is illustrated. It is understood that any valid XML element name can be substituted for the name "xmlNameOfElement".

In the XML schema fragment pattern of FIG. 18, the XML element "xmlNameOfElement" is declared to be a global element of anonymous complex type (see line 2) and contains a sequence (line 3) with an "any" element (lines 4-6). As known in the art, the "any" element specifies that any well-formed XML belonging to any namespace in a whitespace separated list set forth in the "namespace" attribute is permissible in the content model of a type (if no namespace attribute is specified, no namespace restrictions are applied). The "any" element includes a "processContents" attribute with a value of "lax" (line 4) and "minOccurs" and "maxOccurs" attributes set to "0" and "unbounded" respectively (lines 5 and 6). When used with a standard W3C XML schema validator at run time, this generated schema fragment will allow any content to be included in an XML instance document (i.e. message) between the begin tag <xmlNameOfElement> and end tag </xmlNameOfElement>.

It should be appreciated that the XML schema fragment pattern of FIG. 18 is equally applicable to an XML schema group with a content kind attribute set to the value "open".

Turning to FIG. 19, an XML schema fragment pattern 1900 for rendering an XML element having a complex type with a content kind attribute set to the value "openDefined" is illustrated. This pattern is the same as the pattern of FIG. 18 with the exception of an added namespace attribute in the "any" element which is set to the value "http://www.nslcom http://www.ns2com". When used with a standard W3C XML schema validator at run time, this generated schema fragment will allow any content belonging to the specified schema namespaces to be included in an XML instance document (i.e. message) between the begin tag <xmlNameOfElement> and end tag </xmlNameOfElement>. The fragment of FIG. 19 would be equally applicable to XML schema groups with a content kind attribute set to the value "openDefined" (e.g. see lines 29 to 31 of FIG. 21 which are generated in the lax mode based on the logical model extension at lines 27 and 28 of FIG. 5A. The contactinfo.xsd file 2100 of FIG. 21 is an alternative version of the contactinfo.xsd file 1100 of FIG. 11.).

It will be appreciated that the XML schema fragment patterns of both FIGS. 18 and 19 are essentially fixed patterns, with only the name of the relevant XML element being inserted (e.g. at line 1) and with relevant namespace information being inserted for the "opendefined" case (line 7 of FIG. 19).

FIG. 20 illustrates an XML schema fragment pattern 2000 for an XML element having a complex type with a composition kind attribute set to the value "unorderedSet". The italicized portions of FIG. 20 (lines 5, 6 and 8) denote fields to be filled in with appropriate content in actual generated XML schema fragments.

As shown in FIG. 20, the element is declared to be a global element of anonymous complex type (line 2) and includes a sequence with a "maxOccurs" attribute set to "unbounded" (lines 3 and 4). The value of the "minOccurs" attribute is set to a value equivalent to the "minOccurs" of the original sequence (i.e. of the sequence within the "xmlNameOfElement" element in the message model 200) multiplied by the number of items (i.e. elements, element references or group references) in the original sequence. This ensures that an appropriate minimum number of elements of the resultant sequence will be enforced. The original sequence contents (lines 7-9) are "wrapped" by a choice to effectively make the order of receipt of individual elements of the sequence immaterial. That is, when used with a standard W3C XML schema validator, this generated schema fragment will allow the subordinate elements of the "xmlNameOfElement" element in an XML instance document (i.e. message) to appear in any order between the begin tag <xmlNameOfElement> and end tag </xmlNameOfElement>.

A concrete example of the rendering of an XML element having a complex type with a composition kind attribute set to the value "unorderedSet" is shown in FIG. 21. The XML schema fragment at lines 9 to 18 of FIG. 21 is generated from the logical model extension at line 12 of FIG. 5A which pertains to the global "ContactlnfoType" complex type (lines 9 to 21). The latter complex type contains four references to the elements "resPhoneNo", "officePhoneNo", "faxNo" and "cellPhoneNo" respectively and an implicit minOccurs attribute with a value of As shown at line 10 of FIG. 21, the minOccurs attribute of the sequence element in the generated XML schema fragment has a value of "4". This value represents the minOccurs of the original sequence (1) multiplied by the number of items in the original sequence (4). The original sequence contents are reproduced within a choice at lines 11 to 16. It is noted that no containing element declaration as shown at lines 1 and 12 of FIG. 20 appears in FIG. 21 since the original complex type of FIG. 5A is globally declared.

When used with a standard W3C XML schema validator, this generated schema fragment of FIG. 21 supports validation of any instance of the "ContactlnfoType" complex type which contains four instances of any of the "resPhoneNo", "officePhoneNo", "faxNo" and "cellPhoneNo" elements, in any order.

It is noted that, in the event that the lax validation mode has been elected, the resultant employee.xsd file, address.xsd file, and XML1AuxGenFile.xsd file will be the same as the ones shown as having been generated in the strict mode in FIGS. 9A to 9C, 10 and 12 respectively. However the resultant contactinfo.xsd file will be as shown in FIG. 21 rather than as shown in FIG. 11.

FIG. 22 illustrates the contents of the messageSet.mset file 2200 comprising the physical model 200 of FIG. 2. The "messageSet.mset" file 2200 is a serialized representation of a message set containing default characteristics of the XML1 wire format, as described in the co-pending U.S. patent application Ser. No. 10/703,037, incorporated by reference above.

As will be appreciated by those skilled in the art, modifications to the above-described embodiment can be made without departing from the essence of the invention. For example, XML schema generation in either of strict mode or lax mode may be performed by default, with the non-default mode possibly being unavailable.

Also, although the described embodiment operates on a computer server, it is understood that alternative embodiments may operate on other computing devices, such as portable or handheld devices.

Other modifications will be apparent to those skilled in the art and, therefore, the invention is defined in the claims.

What is claimed is:

1. A computer readable medium for use in validating an eXtensible Markup Language (XML) message in a particular wire format, said computer readable medium containing computer-executable instructions which, when performed by a processor in a computing device, cause the computing device to:
from a custom XML schema based message model having at least one wire format specific rendering option associated with an XML entity representing at least a portion of said XML message, generate an XML schema fragment for use in validating said XML message at a node that lacks said custom XML schema based message model, wherein said XML schema fragment conforms to said particular wire format, wherein said custom XML schema based message model comprises a logical model of said message that complies with a standard XML schema, and wherein said custom XML schema based message model comprises a physical model that customizes said message using a logical model extension that is unsupported by said standard XML schema, and wherein said physical model comprises said logical model extension and a wire format specific rendering option, wherein said wire format specific rendering option is a directive that specifies a different wire format for each partial component of said message.

2. The computer readable medium of claim 1, wherein said XML entity is an element declaration, and wherein generating said XML schema fragment comprises setting a name attribute of an element declaration to an overriding name in said particular wire format.

3. The computer readable medium of claim 1, wherein said XML entity is an element reference referencing a referenced global element declaration, and wherein said computer-executable instructions further cause said computing device to:
(a) determine whether a target namespace of said referenced global element declaration is null or the same as a target namespace of an XML schema containing said element reference; and
(b) generate an element declaration based on (a).

4. The computer readable medium of claim 3, wherein (b) comprises, if it is determined in (a) that said target namespace of said referenced global element declaration is null or the same as the target namespace of an XML schema containing said element reference:
generating in place of said element reference a local element declaration having a type matching a determined type of said referenced global element declaration and having a name attribute with a value set to said overriding name.

5. The computer readable medium of claim 3, wherein (b) comprises, if it is determined in (a) that said target namespace of said referenced global element declaration is neither null nor the same as the target namespace of an XML schema containing said element reference:
creating a new global element declaration having a type matching a determined type of said referenced global element declaration and a target namespace matching said target namespace of said referenced global element declaration and a name attribute with a value set to said overriding name; and
setting said element reference to reference said new global element declaration.

6. The computer readable medium of claim 1, wherein said XML entity is a local element declaration of simple type or an element reference referencing a referenced global element declaration of simple type, and wherein said wire format specific rendering option specifies that said XML entity is to be rendered as an attribute of an XML element of complex type having a complex type definition which contains said XML entity.

7. The computer readable medium of claim 6, wherein said XML entity is contained in a group referenced by a group reference contained in said complex type definition.

8. The computer readable medium of claim 6, wherein generating said XML schema fragment comprises:
   identifying a first set of local element declarations or element references contained within said complex type definition to which said rendering option is applicable;
   identifying a second set of local element declarations or element references contained within one or more groups referenced by group references in said complex type definition to which said rendering option is applicable; and
   for each local element declaration or element reference in said first set and said second set, determining a target namespace of a current local element declaration or of a global element declaration referenced by a current element reference and generating an attribute declaration based on said determining.

9. The computer readable medium of claim 8, wherein said generating said attribute declaration further comprises: if the determined target namespace of the current local element declaration or referenced global element declaration is the same as a target namespace of said complex type definition, or if the determined target namespace of the current local element declaration or referenced global element declaration is null and an "AttributeFormDefault" attribute of an XML schema containing said complex type definition has a value of "unqualified", generating a local attribute declaration within said complex type definition having a type matching a determined type of said local element declaration or referenced global element declaration.

10. The computer readable medium of claim 9, wherein said rendering option further specifies an overriding attribute name and wherein said generating said local attribute declaration comprises generating a local attribute declaration with said overriding attribute name.

11. The computer readable medium of claim 8, wherein said generating said attribute declaration further comprises: if the determined target namespace of the current local element declaration or referenced global element declaration is different from a target namespace of said complex type definition, and if the determined target namespace of said local element declaration or referenced global element declaration is non-null or an "AttributeFormDefault" attribute of an XML schema containing said complex type definition has a value different from "unqualified":
   creating a new global attribute declaration having a type matching a determined type of the current local element declaration or referenced global element declaration and having a target namespace matching a target namespace of the current local element declaration or referenced global element declaration; and
   adding to said complex type definition an attribute reference referencing said new global attribute declaration.

12. The computer readable medium of claim 11, wherein said rendering option further specifies an overriding attribute name and wherein said creating said new global attribute declaration comprises creating a new global attribute declaration with said overriding attribute name.

13. The computer readable medium of claim 8, wherein said computer-executable instructions further cause said computing device to remove said local element declarations or element references of said first set from said complex type definition.

14. The computer readable medium of claim 8, wherein said computer-executable instructions further cause said computing device to remove said local element declarations or element references of said second set from said one or more groups.

15. The computer readable medium of claim 1, wherein said XML entity is a local element declaration or an element reference referencing a referenced global element and wherein said wire format specific rendering option specifies that said XML entity is to be rendered for said particular wire format as an XML element with an additional attribute having a specified attribute name and a specified attribute value.

16. The computer readable medium of claim 15, wherein said XML entity is a local element declaration and wherein said computer-executable instructions further cause said computing device to:
   determine an original type of said local element declaration;
   create a derived type based on said original type; and
   change the type of said local element declaration from said original type to said derived type.

17. The computer readable medium of claim 16, wherein said rendering option further specifies a target namespace for said additional attribute and wherein said computer-executable instructions further cause said computing device to, if said target namespace for said additional attribute is null or the same as a target namespace of said derived type, add to said derived type a local attribute declaration having said specified attribute name and said specified attribute value.

18. The computer readable medium of claim 16, wherein said rendering option further specifies a target namespace for said additional attribute and wherein said computer-executable instructions further cause said computing device to, if said target namespace for said additional attribute is neither null nor the same as a target namespace of said derived type:
   create a new global attribute declaration having said target namespace for said additional attribute and said specified attribute name and said specified attribute value; and
   add to said derived type an attribute reference referencing said new global attribute declaration.

19. The computer readable medium of claim 15, wherein said XML entity is an element reference referencing a referenced global element declaration and wherein said computer-executable instructions further cause said computing device to:
   (a) determine whether a target namespace of said referenced global element declaration is null or the same as a target namespace of an XML schema containing said element reference; and
   (b) generate an element declaration based on (a).

20. The computer readable medium of claim 19, wherein (b) comprises, if it is determined in (a) that said target namespace of said referenced global element declaration is null or the same as the target namespace of an XML schema containing said element reference:
   generating in place of said element reference a new local element declaration with a derived type based on a determined type of said referenced global element declaration.

21. The computer readable medium of claim 20, wherein said rendering option further specifies a target namespace for said additional attribute and wherein said computer-executable instructions further cause said computing device to, if said target namespace for said additional attribute is null or the same as a target namespace of said derived type, add to said derived type a local attribute having said specified attribute name and said specified attribute value.

22. The computer readable medium of claim 20, wherein said rendering option further specifies a target namespace for said additional attribute and wherein said computer-executable instructions further cause said computing device to, if said target namespace for said additional attribute is neither null nor the same as a target namespace of said derived type:
- create a new global attribute declaration having said target namespace for said additional attribute and said specified attribute name and said specified attribute value; and
- add to said derived type an attribute reference referencing said new global attribute declaration.

23. The computer readable medium of claim 19, wherein (b) comprises, if it is determined in (a) that said target namespace of said referenced global element declaration is neither null nor the same as the target namespace of an XML schema containing said element reference:
- creating a new global element declaration with a derived type based on a determined type of said referenced global element declaration and a target namespace matching said target namespace of said referenced global element declaration; and
- setting said element reference to reference said new global element declaration.

24. The computer readable medium of claim 23, wherein said rendering option further specifies a target namespace for said additional attribute and wherein said computer-executable instructions further cause said computing device to, if said target namespace for said additional attribute is null or the same as a target namespace of said derived type, add to said derived type a local attribute declaration having said specified attribute name and said specified attribute value.

25. The computer readable medium of claim 23, wherein said rendering option further specifies a target namespace for said additional attribute and wherein said computer-executable instructions further cause said computing device to, if said target namespace for said additional attribute is neither null nor the same as a target namespace of said derived type:
- create a new global attribute declaration having said target namespace for said additional attribute and said specified attribute name and said specified attribute value; and
- add an attribute reference referencing said new global attribute declaration to said derived type.

26. The computer readable medium of claim 1, wherein said XML entity is a local element declaration of simple type or an element reference referencing a referenced global element of simple type and wherein said wire format specific rendering option specifies that said XML entity is to be rendered for said particular wire format as an XML element and that its value is to be rendered as a value of an additional attribute having a specified attribute name.

27. The computer readable medium of claim 26, wherein said XML entity is a local element declaration of simple type and wherein said computer-executable instructions further cause said computing device to:
- determine an original type of said local element declaration;
- create a derived type based on said original type; and
- change the type of said local element declaration from said original type to said derived type.

28. The computer readable medium of claim 27, wherein said rendering option further specifies a target namespace for said additional attribute and wherein said computer-executable instructions further cause said computing device to, if said target namespace for said additional attribute is null or the same as a target namespace of said derived type, add to said derived type a local attribute declaration having said specified attribute name and having said original type of said local element declaration.

29. The computer readable medium of claim 27, wherein said rendering option further specifies a target namespace for said additional attribute and wherein said computer-executable instructions further cause said computing device to, if said target namespace for said additional attribute is neither null nor the same as a target namespace of said derived type:
- create a new global attribute declaration having said target namespace for said additional attribute and said specified attribute name and having said original type of said local element declaration; and
- add to said derived type an attribute reference referencing said new global attribute declaration.

30. The computer readable medium of claim 26, wherein said XML entity is an element reference referencing a referenced global element declaration and wherein said computer-executable instructions further cause said computing device to:
(a) determine whether a target namespace of said referenced global element declaration is null or the same as a target namespace of an XML schema containing said element reference; and
(b) generate an element declaration based on (a).

31. The computer readable medium of claim 30, wherein (b) comprises, if it is determined in (a) that said target namespace of said referenced global element declaration is null or the same as the target namespace of an XML schema containing said element reference:
- generating in place of said element reference a new local element declaration with a derived type based on a determined type of said referenced global element declaration.

32. The computer readable medium of claim 31, wherein said rendering option further specifies a target namespace for said additional attribute and wherein said computer-executable instructions further cause said computing device to, if said target namespace for said additional attribute is null or the same as a target namespace of said derived type, add to said derived type a local attribute having said specified attribute name and having said determined type of said global element declaration.

33. The computer readable medium of claim 31, wherein said rendering option further specifics a target namespace for said additional attribute and wherein said computer-executable instructions further cause said computing device to, if said target namespace for said additional attribute is neither null nor the same as a target namespace of said derived type:
- create a new global attribute declaration having said target namespace for said additional attribute and said specified attribute name and said derived type; and
- add to said derived type an attribute reference referencing said new global attribute declaration.

34. The computer readable medium of claim 30, wherein (b) comprises, if it is determined in (a) that said target namespace of said referenced global element declaration is neither null nor the same as the target namespace of an XML schema containing said element reference:
- creating a new global element declaration with a derived type based on a determined type of said referenced global element declaration and a target namespace matching said target namespace of said referenced global element declaration; and
- setting said element reference to reference said new global element declaration.

35. The computer readable medium of claim 34, wherein said rendering option further specifies a target namespace for said additional attribute, and wherein said computer-executable instructions further cause said computing device to, if said target namespace for said additional attribute is null or the same as a target namespace of said derived type, add to said derived type a local attribute having said specified attribute name and said determined type of said referenced global element declaration.

36. The computer readable medium of claim 34, wherein said rendering option further specifies a target namespace for said additional attribute, and wherein said computer-executable instructions further cause said computing device to, if said target namespace for said additional attribute is neither null nor the same as a target namespace of said derived type:
create a new global attribute declaration having said target namespace for said additional attribute and said specified attribute name and having said determined type of said referenced global element declaration; and
add to said derived type an attribute reference referencing said new global attribute declaration.

37. A computer readable medium for use in validating an eXtensible Markup Language (XML) message, said computer readable medium containing computer-executable instructions which, when performed by a processor in a computing device, cause the computing device to:
from a custom XML schema based message model having at least one logical model extension, generate an XML schema fragment for use in validating said XML message at a node which lacks said custom XML schema based message model, wherein said custom XML schema based message model comprises a logical model of said XML message that complies with a standard XML schema, and wherein said custom XML schema based message model comprises a physical model that customizes said message using a logical model extension that is unsupported by said standard XML schema, wherein said custom XML schema based message model has an original group representing at least a portion of said XML message, said logical model extension being associated with said original group, and wherein said original group has an original sequence declaration containing a set of original subordinate entities, and wherein generating said XML schema fragment comprises:
generating a new group;
generating a sequence declaration within said new group, said sequence declaration having a minimum occurrence attribute with a value equivalent to a total number of said original subordinate entities in said set; and
generating a choice declaration within said sequence declaration, said choice declaration containing said set of original subordinate entities.

38. The computer readable medium of claim 37, wherein said custom XML schema based message model has an original complex type definition representing at least a portion of said XML message, said logical model extension being associated with said original complex type definition.

39. The computer readable medium of claim 38, wherein generating said XML schema fragment comprises:
generating a new complex type definition;
generating a sequence declaration within said new complex type definition; and
generating an "any" element declaration within said sequence declaration, said "any" element declaration having a process content attribute specifying lax validation, a minimum occurrence attribute with a value of zero, and a maximum occurrence attribute with a value of "unbounded".

40. The computer readable medium of claim 39, wherein said generating said "any" element declaration further comprises generating a namespace attribute specifying at least one namespace.

41. The computer readable medium of claim 38, wherein said original complex type definition has an original sequence declaration containing a set of original subordinate entities, and wherein generating said XML schema fragment comprises:
generating a new complex type definition;
generating a sequence declaration within said new complex type definition, said sequence declaration having a minimum occurrence attribute with a value equivalent to a total number of said original subordinate entities in said set; and
generating a choice declaration within said sequence declaration, said choice declaration containing said set of original subordinate entities.

42. The computer readable medium of claim 38, wherein said original complex type definition has an original sequence declaration containing a set of original subordinate entities, said original sequence declaration having an original minimum occurrence attribute with an integer value N, and wherein generating said XML schema fragment comprises:
generating a new complex type definition;
generating a sequence declaration within said new complex type definition, said sequence declaration having a minimum occurrence attribute with a value equivalent to a total number of said original subordinate entities multiplied by said integer value N; and
generating a choice declaration within said sequence declaration, said choice declaration containing said set of original subordinate entities.

43. The computer readable medium of claim 42, wherein said generating said new complex type definition comprises generating a new complex type definition within an element declaration.

44. The computer readable medium of claim 42, wherein said generating said new complex type definition comprises generating a new complex type definition within a group declaration.

45. The computer readable medium of claim 37, wherein generating said XML schema fragment comprises:
generating a new group;
generating a sequence declaration within said new group; and
generating an "any" element declaration within said sequence declaration, said "any" element declaration having a process content attribute specifying lax validation, a minimum occurrence attribute with a value of zero, and a maximum occurrence attribute with a value of "unbounded".

46. The computer readable medium of claim 45, wherein said generating said "any" element declaration further comprises generating a namespace attribute specifying at least one namespace.

47. The computer readable medium of claim 37, wherein said original group has an original sequence declaration containing a set of original subordinate entities, said original sequence declaration having an original minimum occurrence attribute with an integer value N, and wherein generating said XML schema fragment comprises:
generating a new group;
generating a sequence declaration within said new group, said sequence declaration having a minimum occurrence attribute with a value equivalent to a total number of said original subordinate entities multiplied by said integer value N; and generating a choice declaration within said sequence declaration, said choice declaration containing said set of original subordinate entities.

48. A computer-implemented method for use in validating an eXtensible Markup Language (XML) message in a particular wire format, the method comprising:

from a custom XML schema based message model having at least one wire format specific rendering option associated with an XML entity representing at least a portion of said XML message, generating, by a processor, an XML schema fragment for use in validating said XML message at a node which lacks said custom XML schema based message model, said XML schema fragment conforming to said particular wire format, wherein said XML entity is a local element declaration of simple type or an element reference referencing a referenced global element declaration of simple type, and wherein said wire format specific rendering option specifies that said XML entity is to be rendered as an attribute of an XML element of complex type having a complex type definition which contains said XML entity.

49. The computer-implemented method of claim 48, wherein said wire format specific rendering option specifies that said XML entity is to be rendered with an overriding name in said particular wire format.

50. The computer-implemented method of claim 49, wherein said XML entity is an element declaration and said generating said XML schema fragment comprises setting a name attribute of said element declaration to said overriding name.

51. The computer-implemented method of claim 49, wherein said XML entity is an element reference referencing a referenced global element declaration and further comprising:

determining, by said processor, whether a target namespace of said referenced global element declaration is null or the same as a target namespace of an XML schema containing said element reference; and generating, by said processor, an element declaration based on said determining.

52. The computer-implemented method of claim 51, wherein said generating said element declaration comprises, if said determining determines that said target namespace of said referenced global element declaration is null or the same as the target namespace of an XML schema containing said element reference:

generating, by said processor, in place of said element reference a local element declaration having a type matching a determined type of said referenced global element declaration and having a name attribute with a value set to said overriding name.

53. The computer-implemented method of claim 51, wherein said generating said element declaration comprises, if said determining determines that said target namespace of said referenced global element declaration is neither null nor the same as the target namespace of an XML schema containing said element reference:

creating, by said processor, a new global element declaration having a type matching a determined type of said referenced global element declaration and a target namespace matching said target namespace of said referenced global element declaration and a name attribute with a value set to said overriding name; and setting, by said processor, said element reference to reference said new global element declaration.

54. The computer-implemented method of claim 48, wherein said XML entity is contained in a group referenced by a group reference contained in said complex type definition.

55. The computer-implemented method of claim 48, wherein said generating said XML schema fragment comprises:

identifying a first set of local element declarations or element references contained within said complex type definition to which said rendering option is applicable;

identifying a second set of local element declarations or element references contained within one or more groups referenced by group references in said complex type definition to which said rendering option is applicable; and for each local element declaration or element reference in said first set and said second set, determining a namespace of a current local element declaration or of a global element declaration referenced by a current element reference and generating an attribute declaration based on said determining.

56. The computer-implemented method of claim 55, wherein said generating said attribute declaration comprises, if said determining determines that, either said target namespace of the current local element declaration or referenced global element declaration is the same as a target namespace of said complex type definition, or said target namespace of the current local element declaration or referenced global element declaration is null and an "AttributeFormDefault" attribute of an XML schema containing said complex type definition has a value of "unqualified", generating a local attribute declaration within said complex type definition having a type matching a determined type of said local element declaration or referenced global element declaration.

57. The computer-implemented method of claim 56, wherein said rendering option further specifies an overriding attribute name and wherein said generating said local attribute declaration comprises generating a local attribute declaration with said overriding attribute name.

58. The computer-implemented method of claim 55, wherein said generating said attribute declaration comprises, if said determining determines that, said target namespace of the current local element declaration or referenced global element declaration is different from a target namespace of said complex type definition, and said target namespace of said local element declaration or referenced global element declaration is non-null or an "AttributeFormDefault" attribute of an XML schema containing said complex type definition has a value different from "unqualified":

creating, by said processor, a new global attribute declaration having a type matching a determined type of the current local element declaration or referenced global element declaration and having a target namespace matching a target namespace of the current local element declaration or referenced global element declaration; and adding, by said processor, to said complex type definition an attribute reference referencing said new global attribute declaration.

59. The computer-implemented method of claim 58, wherein said rendering option further specifies an overriding attribute name and wherein said creating said new global attribute declaration comprises creating a new global attribute declaration with said overriding attribute name.

60. The computer-implemented method of claim 48, wherein said XML entity is a local element declaration or an element reference referencing a referenced global element and wherein said wire format specific rendering option specifies that said XML entity is to be rendered for said particular wire format as an XML element with an additional attribute having a specified attribute name and a specified attribute value.

61. The computer-implemented method of claim 60, wherein said XML entity is a local element declaration and further comprising:
determining, by said processor, an original type of said local element declaration;
creating, by said processor, a derived type based on said original type; and
changing, by said processor, the type of said local element declaration from said original type to said derived type.

62. The computer-implemented method of claim 61, wherein said rendering option further specifies a target namespace for said additional attribute and further comprising, if said target namespace for said additional attribute is null or the same as a target namespace of said derived type, adding to said derived type a local attribute declaration having said specified attribute name and said specified attribute value.

63. The computer-implemented method of claim 61, wherein said rendering option further specifies a target namespace for said additional attribute and further comprising, if said target namespace for said additional attribute is neither null nor the same as a target namespace of said derived type:
creating, by said processor, a new global attribute declaration having said target namespace by said additional attribute and said specified attribute name and said specified attribute value; and
adding, by said processor, to said derived type an attribute reference referencing said new global attribute declaration.

64. The computer-implemented method of claim 60, wherein said XML entity is an element reference referencing a referenced global element declaration and further comprising:
determining, by said processor, whether a target namespace of said referenced global element declaration is null or the same as a target namespace of an XML schema containing said element reference; and
generating, by said processor, an element declaration based on said determining.

65. The computer-implemented method of claim 64, wherein said generating said element declaration comprises, if said determining determines that said target namespace of said referenced global element declaration is null or the same as the target namespace of an XML schema containing said element reference:
generating, by said processor, in place of said element reference a new local element declaration with a derived type based on a determined type of said referenced global element declaration.

66. The computer-implemented method of claim 65, wherein said rendering option further specifies a target namespace for said additional attribute and further comprising, if said target namespace for said additional attribute is null or the same as a target namespace of said derived type, adding to said derived type a local attribute having said specified attribute name and said specified attribute value.

67. The computer-implemented method of claim 65, wherein said rendering option further specifies a target namespace for said additional attribute and further comprising, if said target namespace for said additional attribute is neither null nor the same as a target namespace of said derived type:
creating, by said processor, a new global attribute declaration having said target namespace for said additional attribute and said specified attribute name and said specified attribute value; and
adding, by said processor, to said derived type an attribute reference referencing said new global attribute declaration.

68. The computer-implemented method of claim 64, wherein said generating said element declaration comprises, if said determining determines that said target namespace of said referenced global element declaration is neither null nor the same as the target namespace of an XML schema containing said element reference:
creating, by said processor, a new global element declaration with a derived type based on a determined type of said referenced global element declaration and a target namespace matching said target namespace of said referenced global element declaration; and
setting, by said processor, said element reference to reference said new global element declaration.

69. The computer-implemented method of claim 68, wherein said rendering option further specifies a target namespace for said additional attribute and further comprising, if said target namespace for said additional attribute is null or the same as a target namespace of said derived type, adding to said derived type a local attribute declaration having said specified attribute name and said specified attribute value.

70. The computer-implemented method of claim 68, wherein said rendering option further specifies a target namespace for said additional attribute and further comprising, if said target namespace for said additional attribute is neither null nor the same as a target namespace of said derived type:
creating, by said processor, a new global attribute declaration having said target namespace for said additional attribute and said specified attribute name and said specified attribute value; and
adding, by said processor, an attribute reference referencing said new global attribute declaration to said derived type.

71. The computer-implemented method of claim 48, wherein said XML entity is a local element declaration of simple type or an element reference referencing a referenced global element of simple type and wherein said wire format specific rendering option specifies that said XML entity is to be rendered for said particular wire format as an XML element and that its value is to be rendered as a value of an additional attribute having a specified attribute name.

72. The computer-implemented method of claim 71, wherein said XML entity is a local element declaration of simple type and further comprising:
determining, by said processor, an original type of said local element declaration;
creating, by said processor, a derived type based on said original type; and
changing, by said processor, the type of said local element declaration from said original type to said derived type.

73. The computer-implemented method of claim 72, wherein said rendering option further specifies a target namespace for said additional attribute and further comprising, if said target namespace for said additional attribute is null or the same as a target namespace of said derived type, adding to said derived type a local attribute declaration having said specified attribute name and having said original type of said local element declaration.

74. The computer-implemented method of claim 72, wherein said rendering option further specifies a target namespace for said additional attribute and further comprising, if said target namespace for said additional attribute is neither null nor the same as a target namespace of said derived type:
creating, by said processor, a new global attribute declaration having said target namespace for said additional attribute and said specified attribute name and having said original type of said local element declaration; and
adding, by said processor, to said derived type an attribute reference referencing said new global attribute declaration.

75. The computer-implemented method of claim 71, wherein said XML entity is an element reference referencing a referenced global element declaration and further comprising:
determining, by said processor, whether a target namespace of said referenced global element declaration is null or the same as a target namespace of an XML schema containing said element reference; and
generating, by said processor, an element declaration based on said determining.

76. The computer-implemented method of claim 75, wherein said generating said element declaration comprises, if said determining determines that said target namespace of said referenced global element declaration is null or the same as the target namespace of an XML schema containing said element reference:
generating, by said processor, in place of said element reference a new local element declaration with a derived type based on a determined type of said referenced global element declaration.

77. The computer-implemented method of claim 76, wherein said rendering option further specifies a target namespace for said additional attribute and further comprising, if said target namespace for said additional attribute is null or the same as a target namespace of said derived type, adding to said derived type a local attribute having said specified attribute name and having said determined type of said global element declaration.

78. The computer-implemented method of claim 76, wherein said rendering option further specifies a target namespace for said additional attribute and further comprising, if said target namespace for said additional attribute is neither null nor the same as a target namespace of said derived type:
creating, by said processor, a new global attribute declaration having said target namespace for said additional attribute and said specified attribute name and said derived type; and
adding, by said processor, to said derived type an attribute reference referencing said new global attribute declaration.

79. The computer-implemented method of claim 75, wherein said generating said element declaration comprises, if said determining determines that said target namespace of said referenced global element declaration is neither null nor the same as the target namespace of an XML schema containing said element reference:
creating, by said processor, a new global element declaration with a derived type based on a determined type of said referenced global element declaration and a target namespace matching said target namespace of said referenced global element declaration; and
setting, by said processor, said element reference to reference said new global element declaration.

80. The computer-implemented method of claim 79, wherein said rendering option further specifies a target namespace for said additional attribute and further comprising, if said target namespace for said additional attribute is null or the same as a target namespace of said derived type, adding to said derived type a local attribute having said specified attribute name and said determined type of said referenced global element declaration.

81. The computer-implemented method of claim 79, wherein said rendering option further specifies a target namespace for said additional attribute and further comprising, if said target namespace for said additional attribute is neither null nor the same as a target namespace of said derived type:
creating, by said processor, a new global attribute declaration having said target namespace for said additional attribute and said specified attribute name and having said determined type of said referenced global element declaration; and
adding, by said processor, to said derived type an attribute reference referencing said new global attribute declaration.

82. A computer-implemented method for use in validating an eXtensible Markup Language (XML) message, the method comprising:
from a custom XML schema based message model having at least one logical model extension, generating, by a processor, an XML schema fragment for use in validating said XML message at a node which lacks said custom XML schema based message model, wherein said custom XML schema based message model has an original complex type definition representing at least a portion of said XML message, said logical model extension being associated with said original complex type definition, and wherein said generating said XML schema fragment comprises:
generating a new complex type definition;
generating a sequence declaration within said new complex type definition; and
generating an "any" element declaration within said sequence declaration, said "any" element declaration having a process content attribute specifying lax validation, a minimum occurrence attribute with a value of zero, and a maximum occurrence attribute with a value of "unbounded".

83. The computer-implemented method of claim 82, wherein said generating said "any" element declaration further comprises generating a namespace attribute specifying at least one namespace.

84. The computer-implemented method of claim 82, wherein said original complex type definition has an original sequence declaration containing a set of original subordinate entities, and wherein said generating said XML schema fragment comprises:
generating a new complex type definition;
generating a sequence declaration within said new complex type definition, said sequence declaration having a minimum occurrence attribute with a value equivalent to a total number of said original subordinate entities in said set; and
generating a choice declaration within said sequence declaration, said choice declaration containing said set of original subordinate entities.

85. The computer-implemented method of claim 82, wherein said original complex type definition has an original sequence declaration containing a set of original subordinate entities, said original sequence declaration having an original minimum occurrence attribute with an integer value N, and wherein said generating said XML schema fragment comprises:

generating a new complex type definition;

generating a sequence declaration within said new complex type definition, said sequence declaration having a minimum occurrence attribute with a value equivalent to a total number of said original subordinate entities multiplied by said integer value N; and generating a choice declaration within said sequence declaration, said choice declaration containing said set of original subordinate entities.

86. The computer-implemented method of claim 82, wherein said custom XML schema based message model has an original group representing at least a portion of said XML message, said logical model extension being associated with said original group.

87. The computer-implemented method of claim 86, wherein said generating said XML schema fragment comprises:

generating a new group;

generating a sequence declaration within said new group; and generating an "any" element declaration within said sequence declaration, said "any" element declaration having a process content attribute specifying lax validation, a minimum occurrence attribute with a value of zero, and a maximum occurrence attribute with a value of "unbounded".

88. The computer-implemented method claim 87, wherein said generating said "any" element declaration further comprises generating a namespace attribute specifying at least one namespace.

89. The computer-implemented method of claim 86, wherein said original group has an original sequence declaration containing a set of original subordinate entities, and wherein said generating said XML schema fragment comprises:

generating a new group;

generating a sequence declaration within said new group, said sequence declaration having a minimum occurrence attribute with a value equivalent to a total number of said original subordinate entities in said set; and generating a choice declaration within said sequence declaration, said choice declaration containing said set of original subordinate entities.

90. The computer-implemented method of claim 86, wherein said original group has an original sequence declaration containing a set of original subordinate entities, said original sequence declaration having an original minimum occurrence attribute with an integer value N, and wherein said generating said XML schema fragment comprises:

generating a new group;

generating a sequence declaration within said new group, said sequence declaration having a minimum occurrence attribute with a value equivalent to a total number of said original subordinate entities multiplied by said integer value N; and generating a choice declaration within said sequence declaration, said choice declaration containing said set of original subordinate entities.

91. A computing device for use in validating an eXtensible Markup Language (XML) message, said computing device comprising a processor and persistent storage memory in communication with said processor storing computer readable instructions for directing said device to:

from a custom XML schema based message model having at least one logical model extension, generate an XML schema fragment for use in validating said XML message at a node which lacks said custom XML schema based message model, wherein said custom XML schema based message model has an original complex type definition representing at least a portion of said XML message, said logical model extension being associated with said original complex type definition, and wherein said generating said XML schema fragment comprises:

generating a new complex type definition;

generating a sequence declaration within said new complex type definition; and generating an "any" element declaration within said sequence declaration, said "any" element declaration having a process content attribute specifying lax validation, a minimum occurrence attribute with a value of zero, and a maximum occurrence attribute with a value of "unbounded".

* * * * *